United States Patent
Kwon et al.

(10) Patent No.: US 10,146,386 B2
(45) Date of Patent: Dec. 4, 2018

(54) TOUCH INPUT DEVICE, VEHICLE INCLUDING THE SAME, AND MANUFACTURING METHOD THEREOF

(71) Applicant: HYUNDAI MOTOR COMPANY, Seoul (KR)

(72) Inventors: Gideok Kwon, Seoul (KR); Jong Bok Lee, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 19 days.

(21) Appl. No.: 15/347,019

(22) Filed: Nov. 9, 2016

(65) Prior Publication Data
US 2017/0147105 A1    May 25, 2017

(30) Foreign Application Priority Data
Nov. 19, 2015    (KR) .......................... 10-2015-0162736

(51) Int. Cl.
| | |
|---|---|
| *G06F 3/041* | (2006.01) |
| *G06F 3/044* | (2006.01) |
| *B60K 35/00* | (2006.01) |
| *G06F 3/0354* | (2013.01) |

(52) U.S. Cl.
CPC .............. *G06F 3/044* (2013.01); *B60K 35/00* (2013.01); *G06F 3/03547* (2013.01); *G06F 3/041* (2013.01); *B60K 2350/1024* (2013.01); *B60K 2350/925* (2013.01); *G06F 2203/04103* (2013.01); *G06F 2203/04111* (2013.01); *G06F 2203/04809* (2013.01)

(58) Field of Classification Search
CPC .... B60K 2350/1024; B60K 2350/1036; B60K 2350/925; G06F 3/044; G06F 3/03547
See application file for complete search history.

(56) References Cited

U.S. PATENT DOCUMENTS

| | | | |
|---|---|---|---|
| 6,507,337 B1 * | 1/2003 | Sato ........................ | G06F 3/045 345/173 |
| 2009/0219257 A1 * | 9/2009 | Frey ........................ | G06F 3/044 345/173 |
| 2009/0266622 A1 * | 10/2009 | Yoshikawa ............. | G06F 3/044 178/18.01 |
| 2011/0109541 A1 * | 5/2011 | Kitagawa ............... | B60K 35/00 345/156 |
| 2013/0320994 A1 * | 12/2013 | Brittain ................... | G06F 3/044 324/537 |

FOREIGN PATENT DOCUMENTS

| | | |
|---|---|---|
| JP | 2013-246741 A | 12/2013 |
| JP | 2014-191553 A | 10/2014 |

(Continued)

*Primary Examiner* — Michael Pervan
(74) *Attorney, Agent, or Firm* — McDermott Will & Emery LLP

(57) ABSTRACT

The touch input device comprises a base including a metal composite; a first pattern groove formed concavely in one surface of the base, a second pattern groove formed concavely in the other surface of the base; a first sensing pattern disposed in the first pattern groove and including a conductive material; a second sensing pattern disposed in the second pattern groove and including a conductive material; and a wire connecting the first sensing pattern and the second sensing pattern to an integrated circuit.

13 Claims, 31 Drawing Sheets

(56) References Cited

FOREIGN PATENT DOCUMENTS

| | | |
|---|---|---|
| JP | 2015-049601 A | 3/2015 |
| KR | 10-0681157 B1 | 2/2007 |
| KR | 10-2011-0092814 A | 8/2011 |
| KR | 10-2012-0018059 A | 2/2012 |
| KR | 10-2012-0047494 A | 5/2012 |
| KR | 10-2013-0051408 A | 5/2013 |
| KR | 10-2015-0009318 A | 1/2015 |
| KR | 10-2015-0079767 A | 7/2015 |

\* cited by examiner 400-4

TOUCH INPUT DEVICE, VEHICLE INCLUDING THE SAME, AND MANUFACTURING METHOD THEREOF

CROSS-REFERENCE TO RELATED APPLICATION

This application claims benefit of priority to Korean Patent Application No. 10-2015-0162736, filed in the Korean Intellectual Property Office on Nov. 19, 2015, the disclosure of which is incorporated herein by reference.

TECHNICAL FIELD

Embodiments of the present disclosure relate generally to vehicle inputting devices, and more particularly, to a touch input device for enabling a user to input a touch signal, a vehicle including the touch input device, and a manufacturing method of the touch input device.

BACKGROUND

The trend of emphasizing attractiveness of the outer design as well as easy operability of the current communication electronic devices is only growing. As such, the diversification of an input unit represented by a keyboard or a keypad became an important feature. Through these input units usually found in various kinds of display systems such as portable terminals, mobile phones, tablet computers, laptop computers, and even smart TVs (often referred to as connected TV), and the like, information is provided to a user. Recently, with the development of electronic devices, a method of inputting command signals using touch operations is widely used rather than using operation keys, dials, and the like.

A touch input device, constitutes an interface between a user and a communication device using various kinds of displays, enables the user to transfer information to the communication device as the user simply contacts or approaches close to a touch pad or a touch screen using input means such as his/her finger or a touch pen. Because of its easy operability, the touch input device can be widely used by men and women of all ages. Accordingly, the touch input device is applied to various display devices including an Automated Teller Machine (ATM), a Personal Digital Assistant (PDA), a mobile phone, and etc., which also can be applied to various locations and fields, for example, banks, public offices, sightseeing, traffic guidance, and etc.

Recently, efforts have been made to apply touch input devices to health- or medical-related equipment and vehicles. Particularly, the use of a touch panel is increasing because it can be either integrated in a touch screen or separated from the display system. More functions of inputting gestures or moving a point using touch operation has been developed. Studies on improving a recognition rate of gestures input by touch input devices are conducted.

Exemplary methods of implementing a touch input device in such applications include a resistive method, a capacitive method, a Surface Acoustic Wave (SAW) method, and a transmitter method. When an input means such as a finger contacts any one(s) of touch input devices to detect a position at which an input occurred, the touch input device using the capacitive method generates electrode patterns intersecting each other, and detects a change in capacitance therebetween. There is also a type of applying the same in-phase potential to both ends of a transmissive conductive film, and detecting weak current flowing when capacitance is formed by input means such as a finger contacts or approaches close to the transmissive conductive film to thus detect a position at which an input occurred.

Generally, the touch input device has a 2-panel laminate structure in which a first panel including a plurality of first sensing patterns arranged in the first direction (for example, an x-axis direction) on a first substrate. A plurality of first metal patterns to electrically connect the first sensing patterns to a sensor circuit for calculating the positions of the first sensing patterns is disposed on a second panel including a plurality of second sensing patterns arranged in the second direction (for example, an y-axis direction) on a second substrate. A plurality of second metal patterns electrically connect the second sensing patterns to the sensor circuit for calculating the positions of the second sensing patterns, using an adhesive.

Korean Laid-open Patent Application No. 10-2008-0110477 discloses a capacitive type touch panel of a two-layered structure of one sheet type.

Typical methods of manufacturing a touch input device include a method of using Indium Thin Oxide (ITO) that is a transparent electrode to be applied to a touch panel; a method of using a metal mesh; and a method of using a Flexible Printed Circuit Board (FPCB).

These methods require many processing stages, complicated processing, and high manufacturing costs. Particularly, the method of using ITO causes a problem of a rise in product price due to the use of a rare material whose price is usually high.

Furthermore, these methods are vulnerable to external vibrations, impacts or high temperature since they use an adhesion method, and hence the product durability deteriorates rapidly.

SUMMARY

The present disclosure provides a touch input device in which electrodes can be formed without using an adhesion method, and a manufacturing method thereof.

Another aspect of the present disclosure is to provide a slim touch input device, and a manufacturing method thereof.

Additional aspects of the disclosure will be set forth in part in the description which follows and, in part, will be obvious from the description, or may be learned by practice of the disclosure.

A touch input device comprises a base including a metal composite; a first pattern groove formed concavely in one surface of the base; a second pattern groove formed concavely in the other surface of the base, a first sensing pattern disposed in the first pattern groove and including a conductive material, a second sensing pattern disposed in the second pattern groove and including a conductive material; and a wire connecting the first sensing pattern and the second sensing pattern to an integrated circuit.

The first pattern groove intersects with the second pattern groove with the base placed in between, and is perpendicular to the second pattern groove.

The base includes a resin containing at least one of Polycarbonate (PC), Polyamide (PA), and Acrylonitrile-Butadiene-Styrene copolymer (ABS), and a metal oxide containing at least one of Mg, Cr, Cu, Ba, Fe, Ti, and Al.

The base is coated on a resin, glass, or leather.

The base has the same thickness at areas in which the first pattern groove and the second pattern groove are disposed.

The first pattern groove and the second pattern groove have the same depth.

One surface of the base is a curved surface or a discontinuous surface, and the other surface of the base corresponds to the shape of the opposite surface of the base.

In accordance with another aspect of the present invention, a method of manufacturing a touch input device comprises preparing a base including a metal composite, forming a first pattern groove by irradiating laser on one surface of the base; forming a second pattern groove by irradiating laser on the other surface of the base; forming a first sensing pattern and a second sensing pattern by performing plating or deposition on the first pattern groove and the second pattern groove; and determining whether the first sensing pattern and the second sensing pattern are able to operate as sensors by supplying current to the first sensing pattern and the second sensing pattern, and detecting a change in mutual capacitance between the first sensing pattern and the second sensing pattern.

The method of manufacturing a touch input device further comprises coating the base on one of a resin, glass, or leather.

If laser is irradiated to both surfaces of the base, metal seeds are exposed from the inner side surfaces of the first pattern groove and the second pattern groove, and if the first sensing pattern and the second sensing pattern are plated or deposited, a conductive material is attached on the metal seeds.

In accordance with another aspect of the present invention, a vehicle comprises the touch input device installed at a centralized control system in a gear box.

The vehicle comprises a base including a metal composite coated on a rear surface of a resin, glass, or leather, a first pattern groove formed concavely in one surface of the base, a second pattern groove formed concavely in the other surface of the base, a first sensing pattern disposed in the first pattern groove, and including a conductive material, a second sensing pattern disposed in the second pattern groove, and including a conductive material, and a wire connecting the first sensing pattern and the second sensing pattern to an integrated circuit.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 13 is a plan view illustrating a gesture input state;

FIG. 14 is a plan view illustrating a swiping input state; and

FIG. 15 is a plan view illustrating a pressing input state;

FIG. 23 illustrates a process of preparing a first base; FIG. 24 illustrates a process of forming a first pattern groove; FIG. 25 illustrates a process of forming a second pattern groove; FIG. 26 illustrates a process of forming a first and second detection pattern; and FIG. 27 illustrates a process of stacking a coating layer.

DETAILED DESCRIPTION

Figure 1:
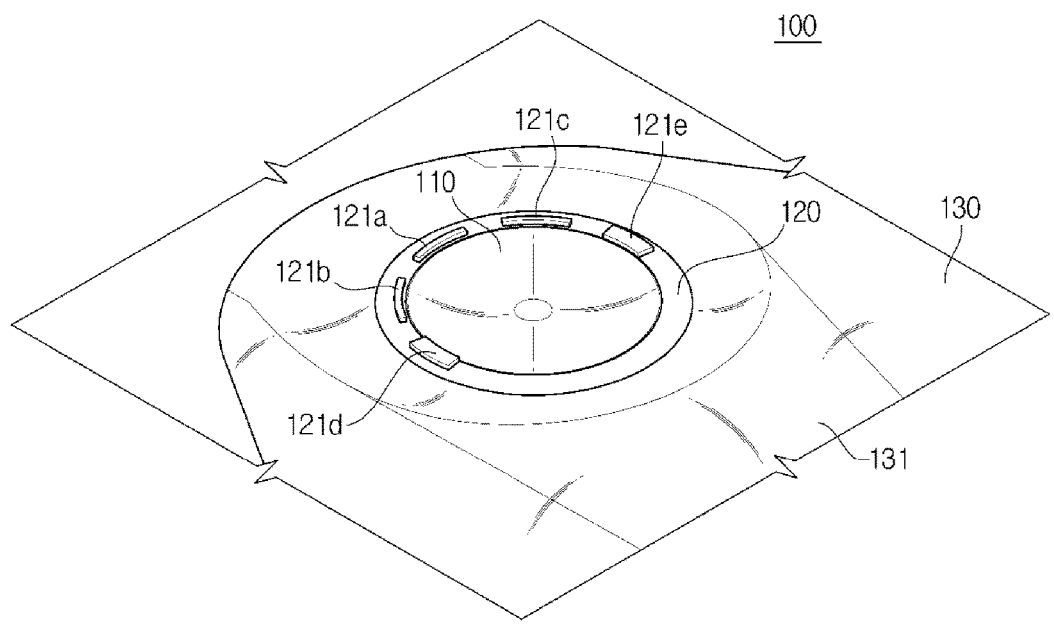
FIG. 1 is a perspective view illustrating a touch input device in accordance with a first embodiment of the present invention.

Hereinafter, embodiments of the present disclosure will be described in detail with reference to the accompanying drawings. The following embodiments are provided to transfer the technical concepts of the present disclosure to one of ordinary skill in the art. However, the present disclosure is not limited to these embodiments, and may be embodied in another form. In the drawings, parts that are irrelevant to the descriptions may be not shown in order to clarify the present disclosure, and also, for easy understanding, the sizes of components are more or less exaggeratedly shown.

FIG. 1 is a perspective view of a touch input device 100 according to a first embodiment of the present disclosure. Referring to FIG. 1, the touch input device 100 according to the first embodiment of the present disclosure may include a touch unit 110 mounted on an installation surface 130.

The touch unit 110 may be implemented as a predetermined area capable of receiving a user's touch signal. For example, the touch unit 110 may be, as shown in FIG. 1, implemented as a circular flat area. However, the touch unit 110 may be implemented as a flat area of another shape including an oval shape.

The touch unit 110 may be a touch pad to which a signal is input when a user contacts the touch pad with his/her finger or a pointer such as a touch pen. The user may input an instruction or command by making a predetermined touch gesture on the touch unit 110.

The touch pad may include a touch film or a touch sheet including a touch sensor. Also, the touch pad may include a touch panel as a display device in which a touch input can be made on a screen.

Meanwhile, operation of recognizing the location of a pointer when the pointer approaches close to a touch pad without contacting the touch pad is called "proximity touch", and operation of recognizing the location of a pointer when the pointer contacts a touch pad is called "contact touch". Herein, the location of a pointer determined by proximity touch may be the location of the pointer positioned vertical to a touch pad when the pointer approaches close to the touch pad.

The touch pad may be a resistive type, an optical type, a capacitive type, an ultrasonic type, or a pressure type. That is, the touch pad may be any one of various kinds of well-known touch pads.

The touch unit 110 may be positioned in the inside of a border area 120. The border area 120 means an area surrounding the touch unit 110, and may be made of a material that is different from the touch unit 110. Also, the border area 120 may be integrated into the installation surface 130, or may be a separate member provided between the installation surface 130 and the touch unit 110. Also, the border area 120 may be omitted, and in this case, the touch unit 110 may be positioned directly in the inside of the installation surface 130.

In the border area 120, a key button or a touch button 121 may be disposed to surround the touch unit 110. That is, the user may input a gesture through the touch unit 110, or may input a signal through the touch button 121 provided in the border area 120 around the touch unit 110.

The touch input device 100 according to the first embodiment of the present disclosure may further include a wrist support part 131 disposed below the touch unit 110 and configured to support the user's wrist. The support surface of the wrist support part 131 may be higher than the touch surface of the touch unit 110. This structure may prevent the user's wrist from being bent upward when making a gesture on the touch unit 110 with his/her finger, while supporting his/her wrist on the wrist support part 131. Accordingly, it is possible to prevent the user's muscular skeletal diseases which may be generated when the user repeatedly makes touch operations, while providing a comfortable operation feeling.

For example, as shown in FIG. 1, the wrist support part 131 may be integrated into the installation surface 130 in such a way to protrude from the installation surface 130. Alternatively, the wrist support part 131 may be a separate member mounted on the installation surface 130.

Figure 2:
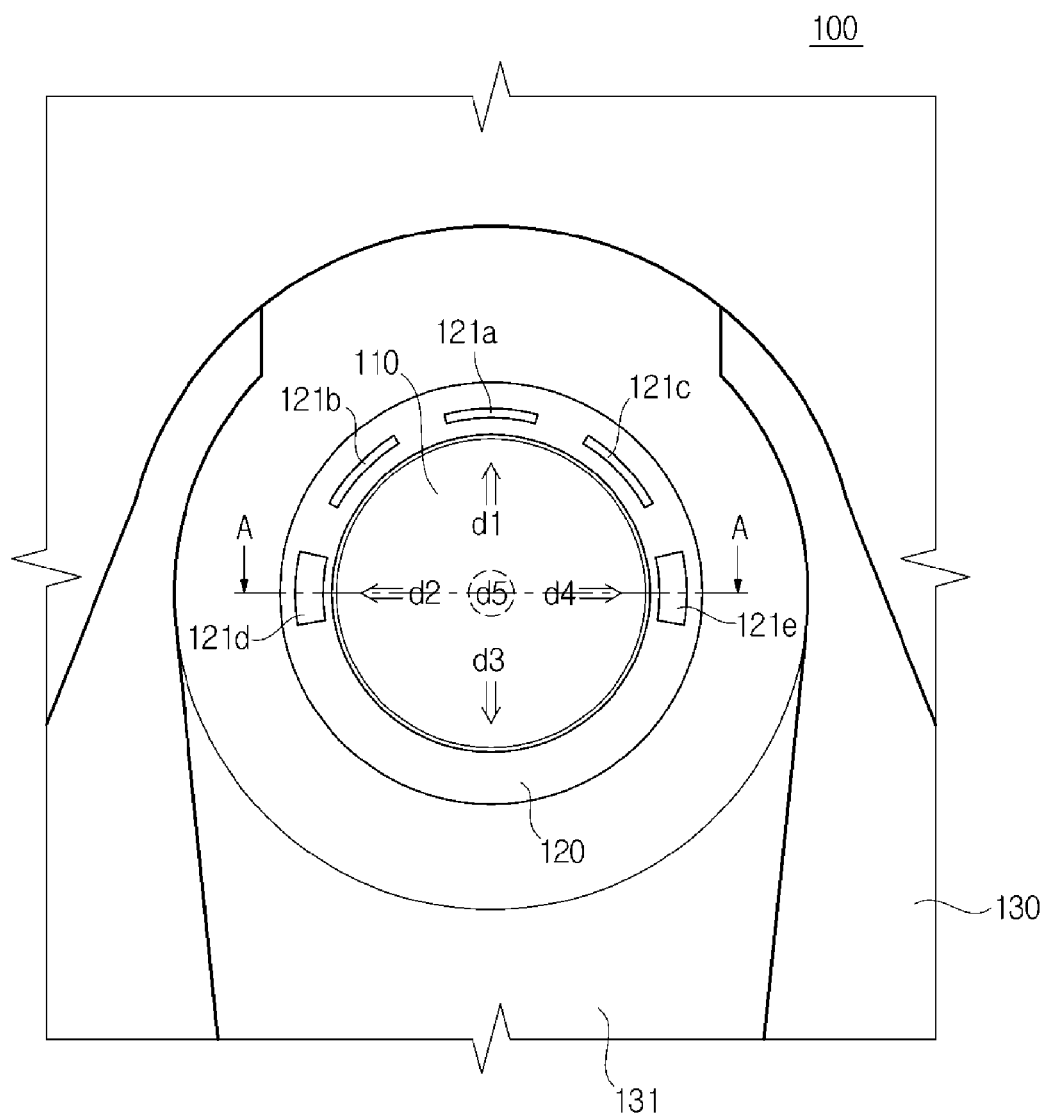
FIG. 2 is a plan view illustrating a method of operating the touch input device in accordance with a first embodiment of the present invention.

FIG. 2 is a plan view for describing a method of operating the touch input device 100 according to the first embodiment of the present disclosure.

The touch input device 100 according to the first embodiment of the present disclosure may include a controller to recognize gesture signals input to the touch unit 110, to analyze the gesture signals, and to issue commands to various devices.

The controller may move a cursor or a menu on a display unit (not shown) according to a movement of the pointer on the touch unit 110. That is, when the pointer moves from top to bottom, the controller may move a cursor appearing on the display unit in the same direction, or move a preliminarily selected menu to its lower menu.

Also, the controller may analyze a trajectory along which the pointer moves to the corresponding trajectory to a predetermined gesture, and execute a command defined for the corresponding gesture. The gesture may be input when the pointer performs flicking, rolling, spinning, or tapping. Also, the user may input a gesture using one of various touch input methods.

The flicking means a touch input method in which the pointer moves in a direction while contacting the touch unit 110 and then releases the contact state, the rolling means a touch input method in which the pointer draws a circular arc with respect to the center of the touch unit 110, the spinning means a touch input method in which the pointer draws a circle with respect to the center of the touch unit 110, and the tapping means a touch input method in which the pointer taps the touch unit 110.

Also, the user may input a gesture using a multi-pointer input method. The multi-pointer input method is a method of inputting a gesture while contacting the touch unit 110 with two pointers simultaneously or sequentially. For example, the user may input a gesture while contacting the touch unit 110 with his/her two fingers. The multi-pointer input method may allow the user to input various commands or instructions.

The various touch input methods may include a method of inputting predetermined arbitrary gestures, as well as a method of inputting gestures, such as figures, characters, or symbols. For example, the user may draw a consonant/vowel of Hangul, an alphabet, an Arabic numeral, or a symbol of the four fundamental arithmetic operations on the touch unit 110 to input a command. Since the user can input a character, a figure, etc. which he/she wants to input, directly through the touch unit 100, instead of selecting the character, figure, etc. from the display unit, it is possible to provide a more intuitive interface while reducing an input time.

The touch unit 110 may be configured to recognize pressing operation or tilting operation. The user may apply pressure to the touch unit 110 to press or tilt a part of the touch unit 110, thereby inputting a desired execution signal. Herein, the pressing operation may include operation of pressing the touch unit 110 horizontally or operation of pressing the touch unit 110 obliquely. Also, if the touch unit 110 is a flexible device, the pressing operation may include operation of pressing a part of the touch unit 110.

For example, the touch unit 110 may be tilted in at least one direction with respect to a direction that is vertical to the touch surface. For example, the touch unit 110 may be tilted in front, back, left, and right directions d1, d2, d3, and d4, as shown in FIG. 2. However, according to another embodiment, the touch unit 110 may be tilted in other various directions than the above-mentioned directions. Also, if the user presses the center area d5 of the touch unit 110, the touch unit 110 may be pressed horizontally.

The user may press or tilt the touch input device 100 to input a predetermined instruction or command. For example, the user may press the center area d5 of the touch unit 110 to select a menu, etc., or may press the upper area d1 of the touch unit 110 to move the cursor upward.

Also, the touch input device 100 may further include a button input unit 121. The button input unit 121 may be disposed around the touch unit 110, for example, at the border area 120. The user can operate the button input unit 121 without changing his/her hand's position while making a gesture, so as to quickly issue an operation command.

The button input unit 121 may include a touch button and a physical button. The touch button may input a signal when it is touched by a pointer, and the physical button may input a signal when its shape changes by a physical external force. The physical button may include, for example, a button configured to be clickable, and a button configured to be tiltable.

In FIG. 2, five buttons 121 (that is, 121a, 121b, 121c, 121d, and 121e) are shown. For example, the buttons 121 may include a Home button 121a to move to a Home menu, a Back button 121d to move from a current screen to a previous screen, an option button 121e to move to an option menu, and two shortcut buttons 121b and 121c. The shortcut buttons 121b and 121c may be used to directly move to an often used menu or a device designated by a user.

Meanwhile, the touch input device 100 may install various kinds of components related to operations therein, which are not shown in the drawings. For example, the touch input device 100 may include a structure of making the touch unit 110 pressed or tilted in the above-mentioned five directions d1 to d5. In the drawings, such a structure is omitted, however, the structure can be easily implemented using technologies generally used in the related art.

Figure 3:
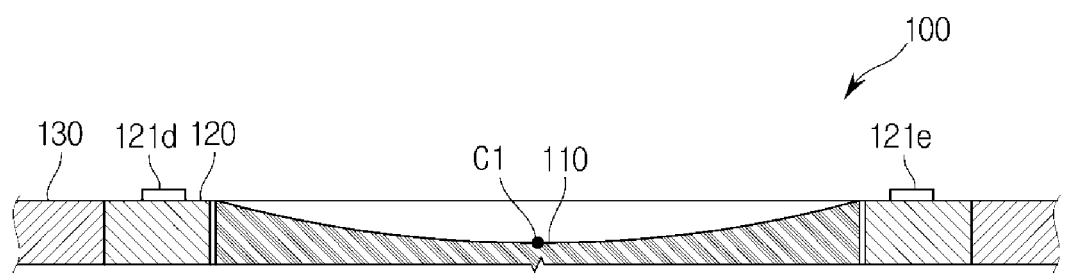
FIG. 3 is a cross-sectional view taken along line A-A of FIG. 2.

Also, in the touch input device 100, various kinds of semiconductor chips and Printed Circuit Boards (PCBs) may be installed. The semiconductor chips may be mounted on the PCBs to perform data processing or to store data. The semiconductor chips may interpret a predetermined electrical signal generated according to an external force applied to the touch input device 100, a gesture recognized by the touch unit 110, or an operation applied to the button 121 installed in the touch input device 100, generate a predetermined control signal according to the result of the interpretation, and then transfer the predetermined control signal to a controller or a display unit of another device. FIG. 3 is a cross-sectional view of the touch input device 100 shown in FIG. 2, cut along a line A-A.

The touch unit 110 may include an area that is lower than a border line with the border area 120 or the installation surface 120. That is, the touch surface of the touch unit 110 may be lower than the border of the touch unit 110 with the border area 120. For example, the touch unit 110 may be inclined downward from the border line with the border area 120, or stepped with respect to the border line with the border area 120. For example, the touch unit 110 according to the first embodiment of the present disclosure may include, as shown in FIG. 3, a curved area having a concave curved surface.

Meanwhile, in FIG. 3, an example in which the touch area of the touch unit 110 is inclined downward without making any step from the border line with the border area 120 is shown. However, the touch area of the touch unit 110 may be inclined downward with a step made downward from the border line with the border area 120.

Since the touch unit 110 includes an area that is lower than the border line with the border area 120, the user can recognize the area and border of the touch unit 110 by his/her tactile sensation. A gesture can be recognized with a high recognition rate when it is made at the center area of the touch unit 110. Also, when similar gestures are input at different locations on the touch unit 110, there is a risk that the gestures will be recognized as different commands. The problem may occur when the user makes a gesture without keeping his/her eyes on the touch area. If the user can recognize the touch area and the touch border with his/her tactile sensation even when he/she makes a gesture while seeing the display unit or while concentrating his/her attention on an external situation, the user can input the gesture at an exact location. That is, the accuracy of a gesture input can be improved.

The touch unit 110 may include a concave shape. Herein, the concave shape means a concaved or depressed shape, and may include a curved depressed shape, an inclined depressed shape, and a stepped depressed shape.

Also, the touch unit 110 may include a concave curved shape. For example, the touch unit 110 according to the first embodiment of the present disclosure may be, as shown in FIG. 3, in the shape of a concave curved surface having a constant curvature. That is, the touch unit 110 may be in the shape of a part of the inner side surface of a sphere. If the curvature of the touch unit 110 is constant, the user may get a minimum of a foreign sensation of operation when making a gesture on the touch unit 110.

Also, the touch unit 110 may include a concave shape that becomes deeper gradually from the edge area to the center or that is maintained at the same depth. That is, the touch unit 110 may have no convex surface. If the touch unit 110 has a convex surface, the user may fail to input a touch operation at an exact location since trajectories along which the user can draw gestures naturally are influenced by the curve of the touch surface. The touch unit 110 shown in FIG. 1 may be lowered with a constant curvature gradually from the edge area to the center C1 to be deepest at the center C1.

Meanwhile, the above-mentioned convex surface does not mean a convex surface at a local area, but means a convex surface throughout the entire touch area of the touch unit 110. Accordingly, in the touch unit 110 according to an embodiment of the present disclosure, a small protrusion may be formed at the center so that the user can intuitively recognize the center with his/her tactile sensation, or the touch unit 110 may be molded such that a small wrinkle protrudes in the shape of a concentric circle.

Alternatively, the curved surface of the touch unit 110 may have different curvatures. For example, the touch unit 110 may include a concave curved surface having a more gradual slope at an area closer to the center. That is, an area of the touch unit 110 that is relatively closer to the center of the touch unit 110 may have a relatively smaller curvature (that is, a relatively greater radius of curvature), and an area of the touch unit 110 that is relatively more distant from the center may have a relatively greater curvature (that is, a relatively smaller radius of curvature), As such, since the curvature of the center area of the touch unit 110 is smaller than that of the edge area of the touch unit 110, the user can easily make a gesture on the center area using a pointer. Also, since the curvature of the edge area is greater than that of the center area, the user can touch the edge area to recognize the curvature, thereby easily recognizing the location of the center area without seeing the touch unit 110.

In the touch input device 100 according to the first embodiment of the present disclosure, since the touch unit 110 includes a concave curved surface, a touch sensation (or an operation sensation) that the user feels when making a gesture can be enhanced. The curved surface of the touch unit 110 may be shaped to be similar to a trajectory drawn by movement of a human's fingertips when he/she rotates or twists his/her wrist while fixing his/her wrist and moving or spreading his/her fingers.

The touch unit 110 including the concave curved surface may be ergonomic compared to a typical flat touch unit. That is, the touch unit 110 can reduce fatigue applied to the user's wrist while improving the user's touch sensitivity. Also, the touch unit 110 may improve the accuracy of gesture input, compared to the case of inputting a gesture to a flat touch unit.

Also, the touch unit 110 may be formed in the shape of a circle. If the touch unit 110 is formed in the shape of a circle, it will be effective to form a concave curved surface. Also, if the touch unit 110 is formed in the shape of a circle, the user can sense the circular touch area of the touch unit 110 with his/her tactile sensation, and thus can easily make a circular gesture, such as rolling or spinning.

Also, since the touch unit 110 is formed in the shape of a concave curved surface, the user can intuitively determine where his/her finger is positioned on the touch unit 110. That is, the touch unit 110 may have different inclinations at all locations since it is formed in the shape of a curved surface. Accordingly, the user may intuitively determine where his/her finger is positioned on the touch unit 110, through a sense of inclination felt through his/her finger.

This feature may provide a feedback about where the user's finger is positioned on the touch unit 110 when the user makes a gesture on the touch unit 110 while fixing his/her eyes on any other place than the touch unit 110, so as to help the user input a desired gesture, thereby improving the accuracy of gesture input. For example, if the user feels that the surface of the touch unit 100 is flat through a sense of inclination felt by his/her finger, the user can intuitively determine that he/she touches the center area of the touch unit 110. Also, the user may recognize a direction of inclination felt by his/her finger to thereby intuitively determine which direction his/her finger is positioned in with respect to the center area.

Meanwhile, the diameter and depth of the touch unit 110 may be decided in the range of an ergonomic design. For example, the diameter of the touch unit 110 may be selected within a range from 50 mm to 80 mm. The reason is because a range to which a finger can move naturally at once when a wrist is fixed is about 80 mm, in consideration of the average length of an adult's finger. If the diameter of the touch unit 110 exceeds 80 mm, the user may need to move his/her hand unnaturally and use his/her wrist more than necessary when drawing a circle along the edge of the touch unit 110.

In contrast, if the diameter of the touch unit 110 is smaller than 50 mm, the touch area may be reduced so that the user may have difficulties in making various gestures. Also, since a gesture is drawn in a narrow area, gesture input errors may be easily generated.

Also, if the touch unit 110 is formed in the shape of a spherical surface, a depth/diameter value of the touch unit 110 may be selected within a range from 0.04 to 0.1. The value obtained by dividing the depth of the touch unit 110 by the diameter of the touch unit 110 means a degree of bending of the curved surface. That is, as the depth/diameter value is greater at a constant diameter of the touch unit 110, the touch unit 110 may have a more concave shape. In contrast, as the depth/diameter value is smaller at a constant diameter of the touch unit 110, the touch unit 110 may have a flatter shape.

If the depth/diameter value of the touch unit 110 is greater than 0.1, the curvature of the concave surface may increase, resulting in deterioration of a user's touch sensitivity. Accordingly, the curvature of the concave surface may be preferably identical to the curvature of a curve drawn by a user's fingertip when the user moves his/her finger naturally on the touch unit 110. However, if the depth/diameter value exceeds 0.1, the user may get an artificial operation feeling when he/she moves his/her finger along the touch unit 110. Also, when the user moves his/her finger naturally and unconsciously on the touch unit 110, the user's finger may be taken off the touch unit 110. In this case, a gesture may be disconnected so that a recognition error may be generated.

In contrast, if the depth/diameter value of the touch unit 110 is smaller than 0.04, the user cannot get a difference of an operation feeling compared to the case of drawing a gesture on a flat touch unit.

Meanwhile, a touch pad that is used in the touch unit 110 formed in the shape of a curved shape may recognize touch operations using an optical method. For example, in the rear surface of the touch unit 110, Infrared Rays Light Emitting Diodes (IR LEDs) and a photodiode array may be disposed. The IR LEDs and the photodiode array may acquire an IR image reflected by a finger, and the controller may extract a touch point from the acquired image.

Figure 4:
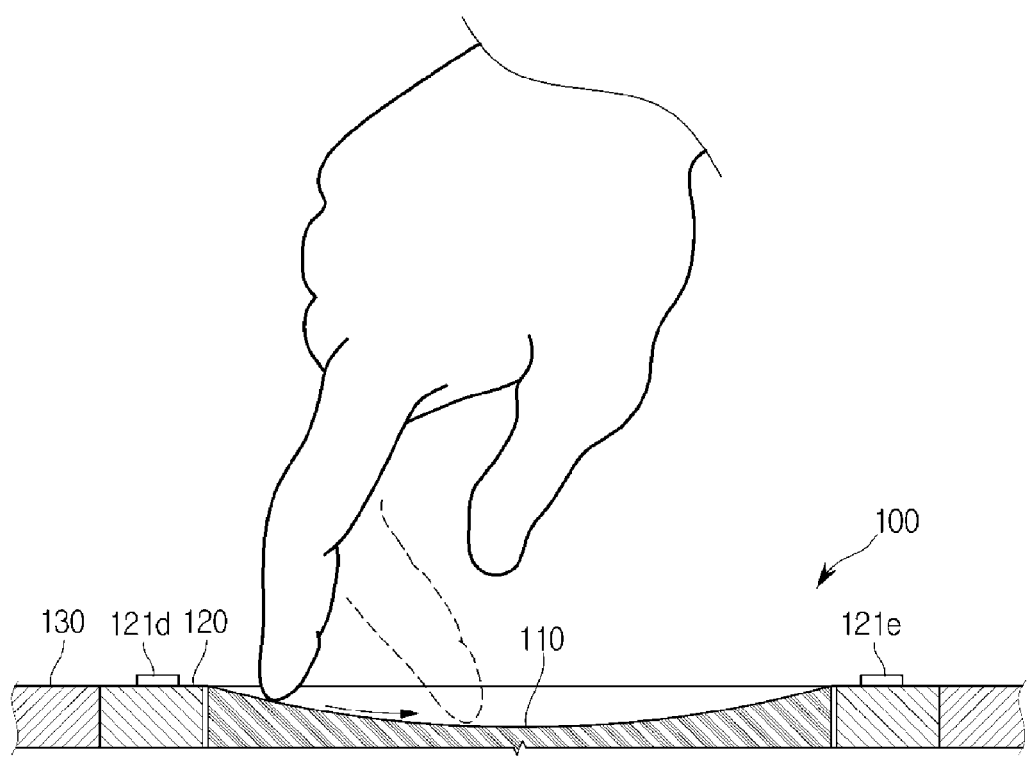
FIG. 4 is a view illustrating a finger trajectory when a user inputs a gesture in a vertical direction.
Figure 5:
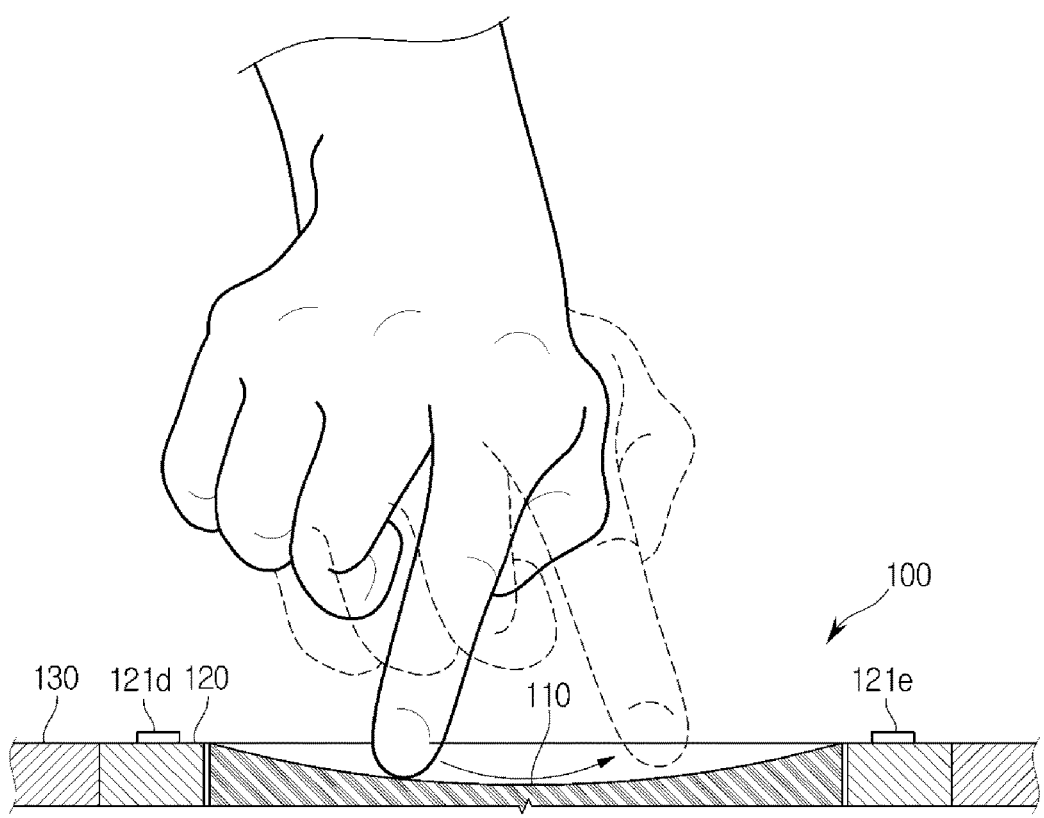
FIG. 5 is a view illustrating a finger trajectory when a user inputs a gesture in a horizontal direction.

FIG. 4 shows a trajectory drawn by a user's finger when the user makes a gesture in an up-down direction, and FIG. 5 shows a trajectory drawn by a user's finger when the user makes a gesture in a left-right direction.

The touch unit 110 according to an embodiment of the present disclosure may include a concave curved surface. The curvature of the touch unit 110 may be decided to an appropriate value such that a user can get a comfortable operation feeling when making a gesture on the touch unit 110. Referring to FIG. 4, when a user moves his/her finger in an up-down direction, the user can make a gesture by natural movement of his/her finger without moving or bending any joint except for the finger. Likewise, referring to FIG. 5, when the user moves his/her finger in a left-right direction, the user can make a gesture by natural movement of his/her finger and wrist without twisting his/her wrist excessively. As such, since the touch unit 110 is designed ergonomically, a user may feel low fatigue even when using the touch unit 110 for a long time, while being protected from muscular skeletal diseases that may be generated in his/her wrist or joints.

The touch unit 110 according to an embodiment of the present disclosure may include a center area and an edge area that have different inclinations or curvatures. If the touch unit 110 is designed to have a flat surface or an inclined surface, the center area and the edge area may have different inclinations, and if the touch unit 110 is designed to have a curved surface, the center area and the edge area may have different curvatures. Hereinafter, modified embodiments will be described with reference to FIGS. 6 and 7.

Figure 6:
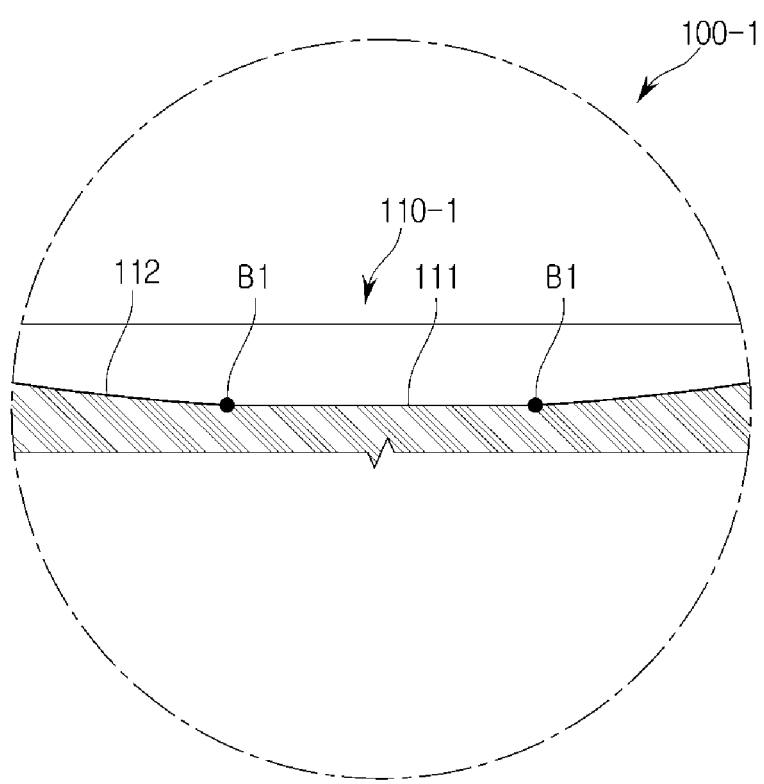
FIG. 6 is a cross-sectional view illustrating a first modified embodiment of the touch input device in accordance with the first embodiment of the present invention.

FIG. 6 shows a first modified embodiment 100-1 of the touch input device 100 according to the first embodiment of the present disclosure.

Although not shown in FIG. 6, a touch unit 110-1 according to the first modified embodiment 100-1 may be formed in the shape of a circle (see FIG. 2). Also, a center area 111 of the touch unit 110-1 may have a flat surface, and an edge area 112 of the touch unit 110-1 may have a concave curved surface. The bounder B1 of the center area 111 and the edge area 112 may also be in the shape of a circle.

The touch unit 110-1 can provide different effects by changing a ratio of the width of the center area 111 to that of the edge area 112. For example, by relatively widening the width of the center area 111 and relatively narrowing the width of the edge area 112, the center area 111 having the flat surface may be used as space for allowing a user to make a gesture such as a character, and the edge area 112 having the curved surface may be used to allow the user to make a circular gesture, such as rolling or spinning.

Also, by relatively narrowing the width of the center area 111 and relatively widening the width of the edge area 112, the edge area 112 having the curved surface may be used as space for allowing the user to make a gesture, and the center area 111 may be used as an indicator for allowing the user to sense the center of the touch unit 110.

Meanwhile, touch signals that are respectively input to the center area 111 and the edge area 112 may be separated from each other. For example, a touch signal acquired from the center area 111 may mean a signal related to a lower menu, and a touch signal acquired from the edge area 112 may mean a signal related to a upper menu.

Figure 7:
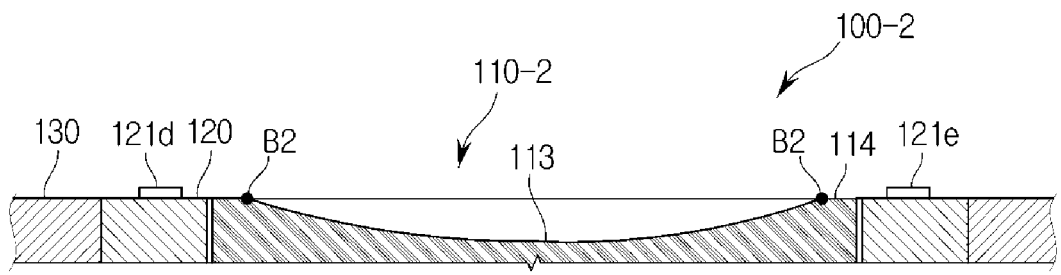
FIG. 7 is a cross-sectional view illustrating a second modified embodiment of the touch input device in accordance with the first embodiment of the present invention.

FIG. 7 shows a second modified embodiment 100-2 of the touch input device 100 according to the first embodiment of the present disclosure.

The touch unit 110-2 according to the second modified embodiment 100-2 may include a center area 113 having a concave curved surface, and an edge area 114 having a flat surface. The border B2 of the center area 113 and the edge area 114 may be in the shape of a circle.

However, the shapes of the center area and the edge area are not limited to the center areas 111 and 113 and the edge areas 112 and 114 of the first and second modified embodiments, and the center area and the edge area may be formed in other various shapes. Also, the center area 111 or 113 and the edge area 112 or 114 may be separated by at least two steps.

Figure 8:
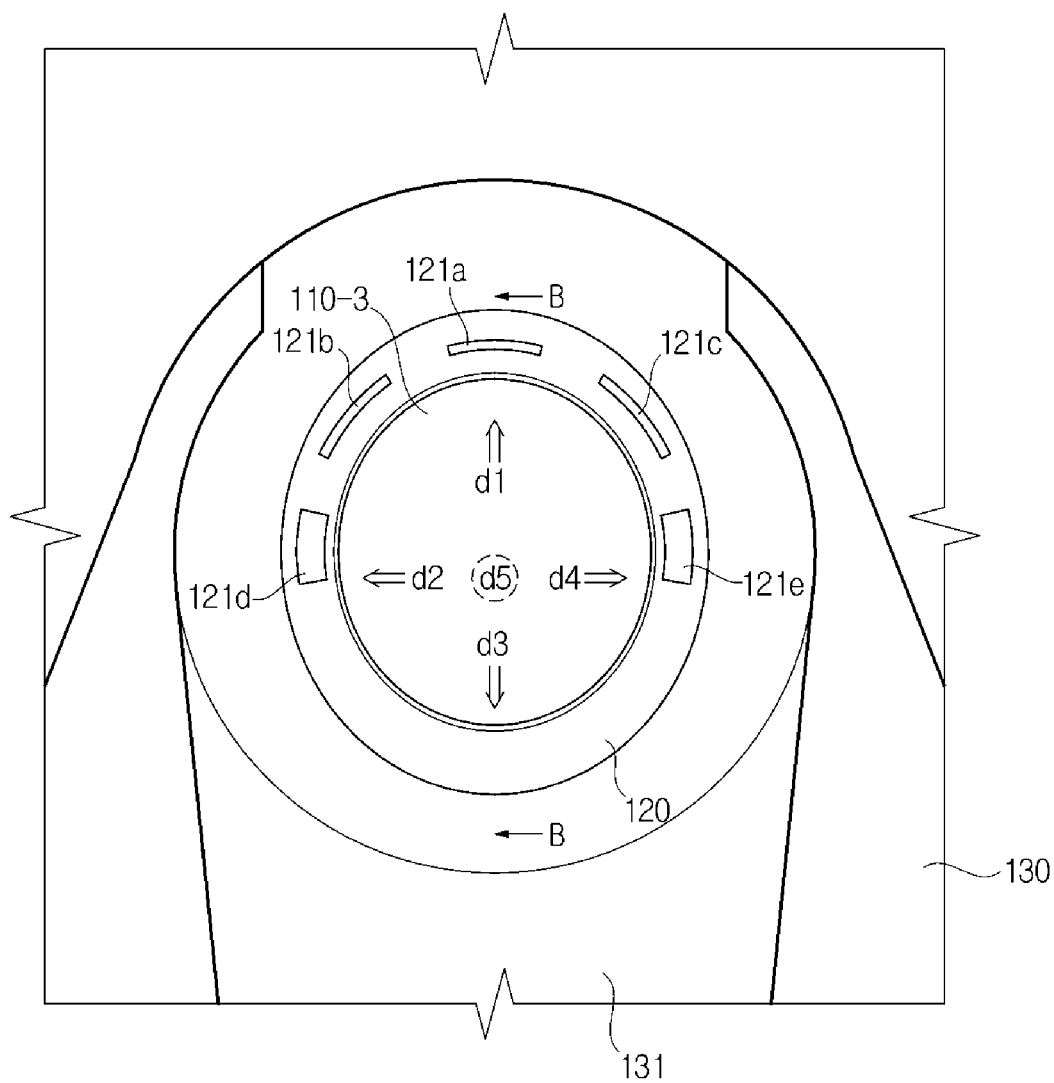
FIG. 8 is a plan view illustrating a third modified embodiment of the touch input device in accordance with the first embodiment of the present invention.
Figure 9:
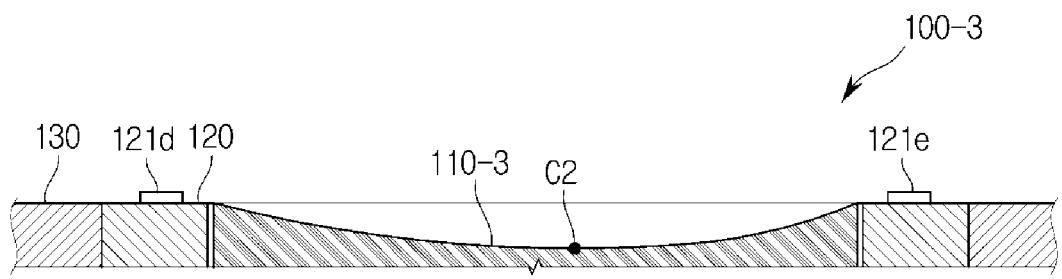
FIG. 9 is a cross-sectional view taken along line B-B of FIG. 8.

FIG. 8 is a plan view showing a third modified embodiment 100-3 of the touch input device 100 according to the first embodiment of the present disclosure, and FIG. 9 is a cross-sectional view of the third modified embodiment 100-3, cut along a line B-B of FIG. 8.

A touch unit 110-3 according to the third modified embodiment 100-3 may be formed in the shape of an oval. For example, as shown in FIG. 8, the touch unit 110-3 may be formed such that the internal diameter in the up-down direction is longer than that in the left-right direction.

Also, the lowest position C2 of the touch unit 110-3 may be leaning toward a predetermined direction from the center of the touch unit 110-3. For example, as shown in FIG. 9, the lowest position C2 of the touch unit 110-3 may be leaning toward the down direction.

Figure 10:
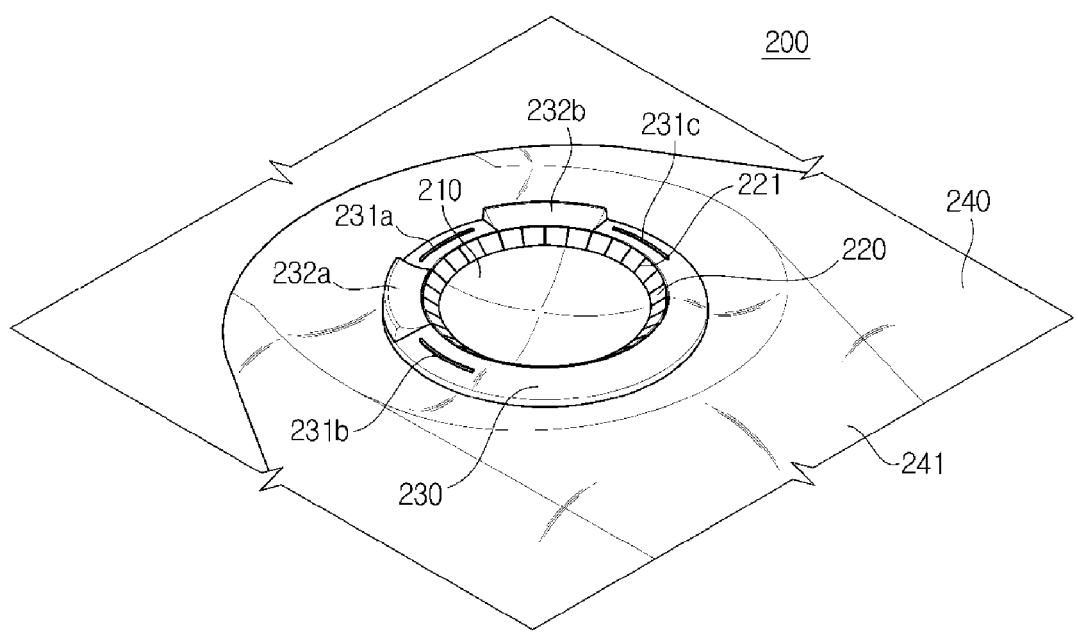
FIG. 10 is a perspective view illustrating a touch input device in accordance with a second embodiment of the present invention.

FIG. 10 is a perspective view of a touch input device 200 according to a second embodiment of the present disclosure.

Referring to FIG. 10, the touch input device 200 according to the second embodiment of the present disclosure may include a plurality of touch units 210 and 220 that a user touches to make a gesture, and a border area 230 surrounding the touch units 210 and 220.

The touch units 210 and 220 may include a gesture input unit 210 located in the center area of the touch input device 200, and a swiping input unit 220 located along the circumference of the gesture input unit 210. The swiping input unit 220 may be provided to allow a user to input a swiping gesture, wherein "swipe" means a gesture that is made without taking a pointer off a touch pad.

Each of the touch units 210 and 220 may be a touch pad to which a signal is input when a user contacts or approaches close to the touch pad with a pointer, such as his/her finger or a touch pen. The user may make a predetermined touch gesture on any one(s) of the touch units 210 and 220 to thus input a desired instruction or command.

The touch pad may include a touch film or a touch sheet including a touch sensor. Also, the touch pad may include a touch panel as a display device in which a touch input can be made through a screen.

Meanwhile, operation of recognizing the location of a pointer when the pointer approaches close to a touch pad without contacting the touch pad is called "proximity touch", and operation of recognizing the location of a pointer when the pointer contacts the touch pad is called "contact touch". Herein, the location of the pointer determined by proximity touch may be the location of the pointer positioned vertical to the touch pad when the pointer approaches close to the touch pad.

The touch pad may be a resistive type, an optical type, a capacitive type, an ultrasonic type, or a pressure type. That is, the touch pad may be any one of various kinds of well-known touch pads.

The border area 230 may be an area surrounding the touch units 210 and 220, and may be provided as a separate member from the touch units 210 and 220. In the border area 230, key buttons 232a and 232b or touch buttons 231a, 231b, and 231c may be positioned to surround the touch units 210 and 220. That is, the user may input a gesture through the touch units 210 and 220, or may input a signal through the touch buttons 231 and 232 provided in the border area 230 around the touch units 210 and 220.

The touch input device 200 may further include a wrist support part 241 disposed below the touch units 210 and 220 and configured to support a user's wrist. The wrist support part 241 may be higher than the touch surface of the touch units 210 and 220. This structure may prevent the user's wrist from being bent when the user makes a gesture on the touch units 210 and 220 with his/her finger, while supporting the user's wrist on the wrist support part 241. Accordingly, the wrist support part 241 may prevent the user's muscular skeletal diseases, while providing a comfortable operation feeling.

Figure 11:
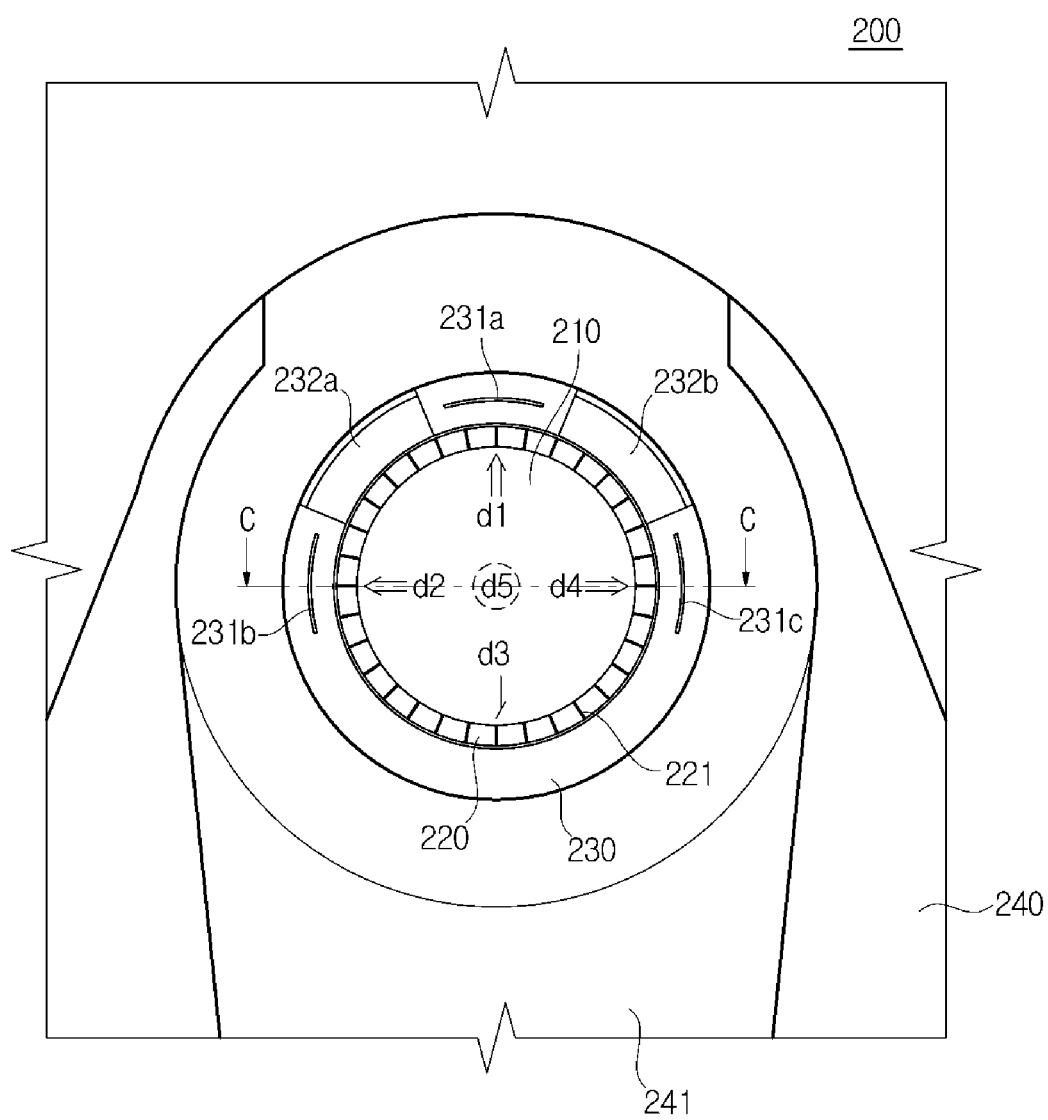
FIG. 11 is a plan view illustrating the touch input device in accordance with the second embodiment of the present invention.
Figure 12:
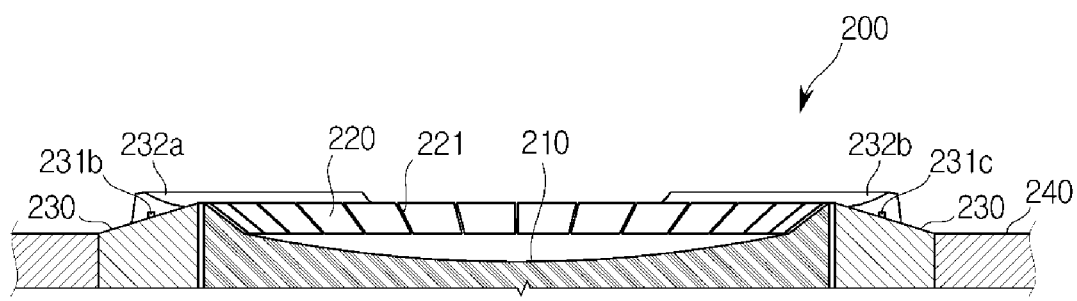
FIG. 12 is a cross-sectional view taken along line C-C of FIG. 11.

FIG. 11 is a plan view of the touch input device 200 according to the second embodiment of the present disclosure, and FIG. 12 is a cross-sectional view of the touch input device 200 shown in FIG. 11, cut along a line C-C of FIG. 11.

The touch units 210 and 220 may include an area that is lower than a border with the border area 230. That is, the touch surfaces of the touch unit 210 and 220 may be lower than the border area 230. For example, the touch units 210 and 220 may be inclined downward from the border with the border area 230, or stepped with respect to the border with the border area 230.

Since the touch units 210 and 220 are located lower than the border with the border area 230, a user can recognize the area and border of the touch units 210 and 220 with his/her tactile sensation. A gesture can be recognized with a high recognition rate when it is made at the center area of the touch units 210 and 220. Also, when similar gestures are input at different locations on the touch units 210 and 220, there is a risk that the controller will recognize the gestures as different commands. The problem may occur when the user inputs a gesture without keeping his/her eyes on the touch areas. If the user can recognize the touch area and the border with his/her tactile sensation even when he/she inputs a gesture while seeing the display unit or while concentrating his/her attention on an external situation, the user can input the gesture at an exact location. That is, the accuracy of gesture input can be improved.

The touch units 210 and 220 may include a gesture input unit 210 located at the center area of the touch input device 200, and a swiping input unit 220 inclined along the circumference of the gesture input unit 210. If the touch units 210 and 220 are formed in the shape of a circle, the gesture input unit 210 may be in the shape of a part of the inner side surface of a sphere, and the swiping input unit 220 may be provided as an inclined surface surrounding the circumference of the gesture input unit 210.

A user may input a swiping gesture along the swiping input unit 210 provided in the shape of a circle. For example, the user may input a swiping gesture in a clockwise direction or in a counterclockwise direction along the swiping input unit 220. Meanwhile, although a circular gesture, such as rolling or spinning, made on the gesture input unit 210, or a gesture of rubbing from left to right belongs to the swiping gesture, the swiping gesture in the current embodiment may be defined as a gesture that is input to the swiping input unit 220.

Swiping gestures that are input to the swiping input unit 220 may be recognized as different gestures when they have different starting points and ending points. That is, a swiping gesture input to an area of the swiping input unit 220 located to the left of the gesture input unit 210, and a swiping gesture input to another area of the swiping input unit 220 located to the right of the gesture input unit 210 may cause different operations. Also, if the user finishes making gestures at different locations although he/she makes the gestures starting from the same location, that is, if the user takes his/her finger off at different locations, the gestures may be recognized as different gestures.

Also, a tap gesture may be input to the swiping input unit 220. That is, if the user taps the swiping input unit 220 at different locations, different commands or instructions may be input according to the locations.

The swiping input unit 220 may include a plurality of gradations 221. The gradations 221 may inform the user of a relative location visually or tactually. For example, the gradations 221 may be engraved or embossed. Also, the gradations 221 may be arranged at regular intervals. Accordingly, the user can intuitively recognize the number of gradations through which his/her finger passes, while making a swiping gesture, thereby precisely adjusting the length of the swiping gesture.

For example, according to the number of gradations through which the user's finger passes to make a swiping gesture, a cursor that is displayed on the display unit may move. If various selectable characters are successively arranged on the display unit, a selected character may move to the next one whenever the user's finger passes through one gradation to make a swiping gesture.

A degree of inclination of the swiping input unit 220 according to an embodiment of the present disclosure may be greater than a degree of tangential inclination of the gesture input unit 210 at the border at which the swiping input unit 220 meets the gesture input unit 210. The user may intuitively recognize the touch area of the gesture input unit 210 from a difference in inclination between the gesture input unit 210 and the swiping input unit 220 when making a gesture on the gesture input unit 210.

Meanwhile, while a gesture is made on the gesture input unit 210, no touch operation made on the swiping input unit 220 may be recognized. Accordingly, although the user touches the swiping input unit 220 when making a gesture on the gesture input unit 210, the gesture made on the gesture input unit 210 may not overlap with any gesture made on the swiping input unit 210.

Meanwhile, the gesture input unit 210 and the swiping input unit 220 may be integrated into one unit. Also, the gesture input unit 210 and the swiping input unit 220 may have separate touch sensors or a single touch sensor. If the gesture input unit 210 and the swiping input unit 220 have a single touch sensor, the controller may distinguish the touch area of the gesture input unit 210 from the touch area of the swiping input unit 220, thereby distinguishing a gesture input signal acquired from the gesture input unit 210 from a gesture input signal acquired from the swiping input unit 220.

The touch input unit 200 may further include a plurality of button input parts 231 and 232. The button input parts 231 and 232 may be arranged around the touch units 210 and 220. The user may operate the buttons 231 and 232 without changing the position of his/her hand, while making a gesture, thereby quickly issuing an operation command.

The button input parts 231 and 232 may include a plurality of touch buttons 232a 231b, and 231c each of which can perform a designated function according to touch operation from the user, or a plurality of pressure buttons 232a and 232b each of which can perform a designated function when its position changes by an external force applied by the user. If the button input parts 231 and 232 include the touch buttons 231a, 231b, and 231c, the button input parts 231 and 232 may also include a touch sensor.

The pressure buttons 232a and 232b may be configured to slide in the up-down direction (that is, an out-of-plane direction) or in an in-plane direction by an external force. When the pressure buttons 232a and 232b is configured to slide in the in-plane direction, the user may pull or push the pressure buttons 232a and 232b to input a signal. Also, the pressure buttons 232a and 232b may be configured to input different signals between when the user pushes the pressure buttons 232a and 232b and when the user pulls the pressure buttons 232a and 232b.

In FIG. 11, five buttons 231 and 232 (that is, 231a, 231b, 231c, 232a, and 232b) are shown. For example, the buttons 231 and 232 may include a Home button 231a to move to a Home menu, a Back button 231b to move from a current screen to a previous screen, an Option button 231c to move to an Option menu, and two shortcut buttons 232a and 232b. The shortcut buttons 232a and 232b may be used to directly move to an often used menu or a device designated by a user.

In the button input parts 231 and 232 according to an embodiment of the present disclosure, the touch buttons 231a, 231b, and 231c may be positioned in the upper area and both side areas, and the pressure buttons 232a and 232b may be respectively positioned between the touch button 231a and the touch button 231b and between the touch button 231a and the touch button 231c. As such, since the pressure buttons 232a and 232b are respectively disposed between the neighboring touch buttons 231a, 231b, and 231c, the user can be prevented from making a mistake of operating his/her unintended touch button 231a, 231b, or 231c.

Figure 13:
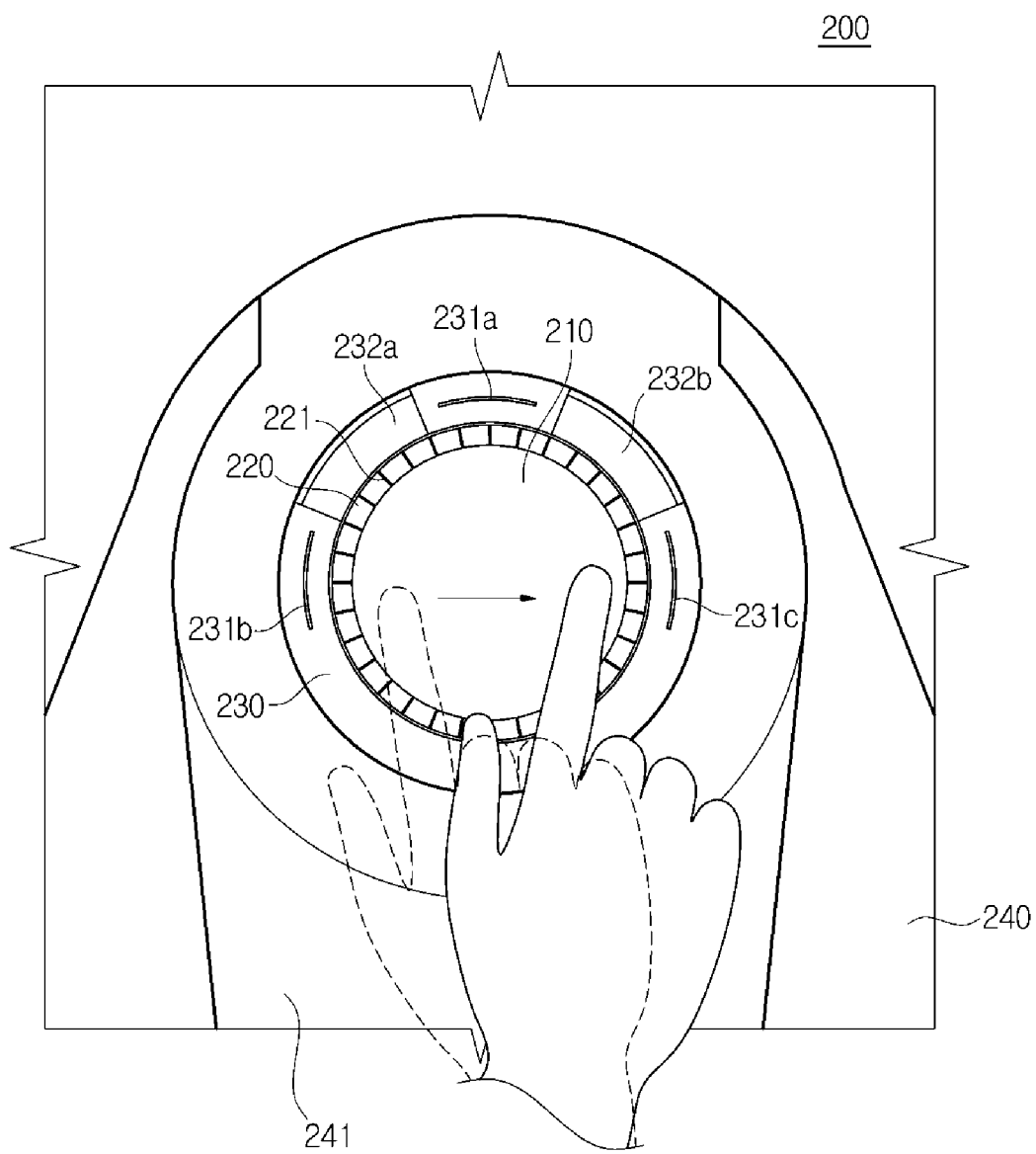
FIGS. 13-15 are views for describing the manipulation of the touch input device in accordance with the second embodiment of the present invention, where
Figure 14:
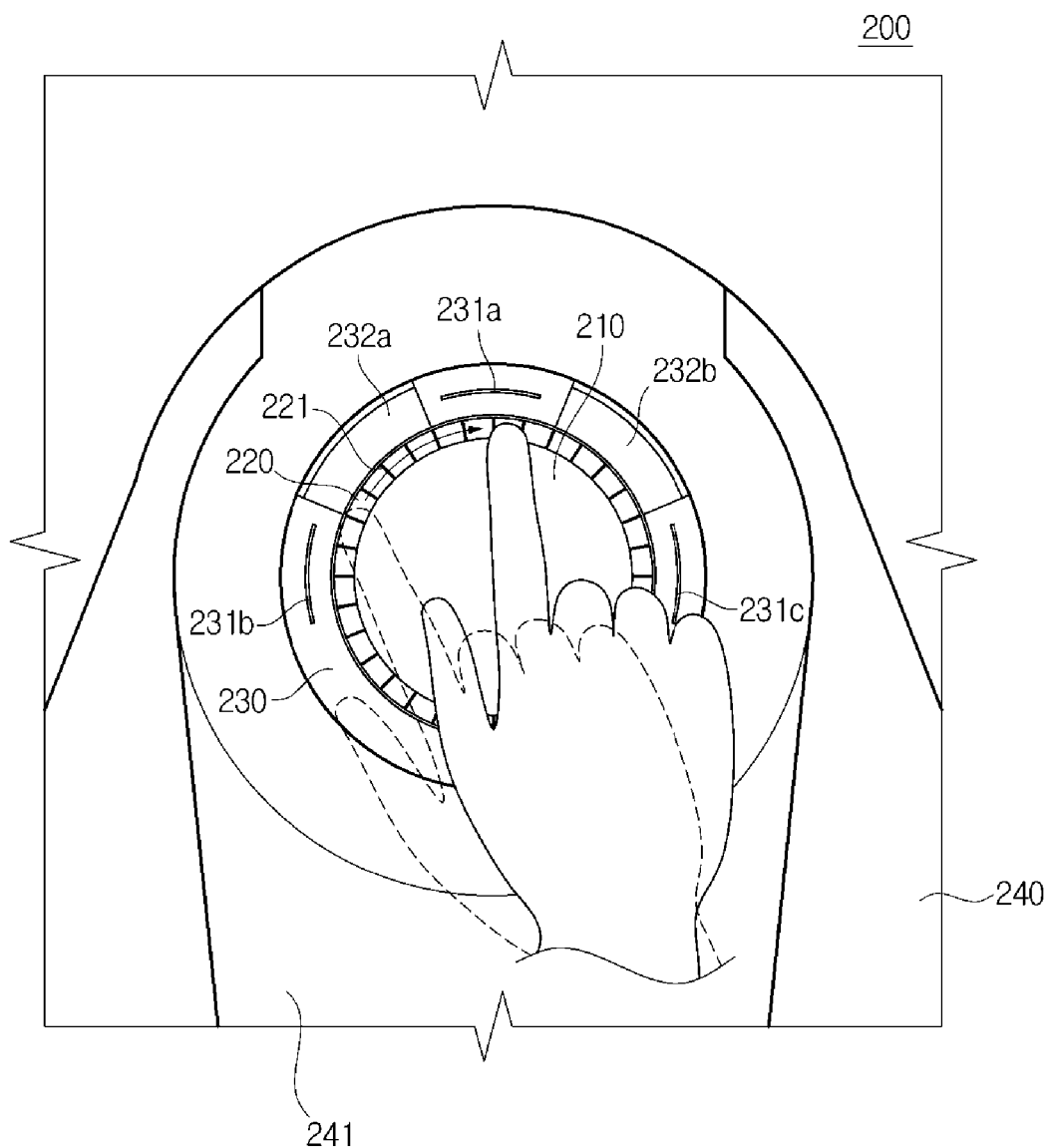
Figure 15:
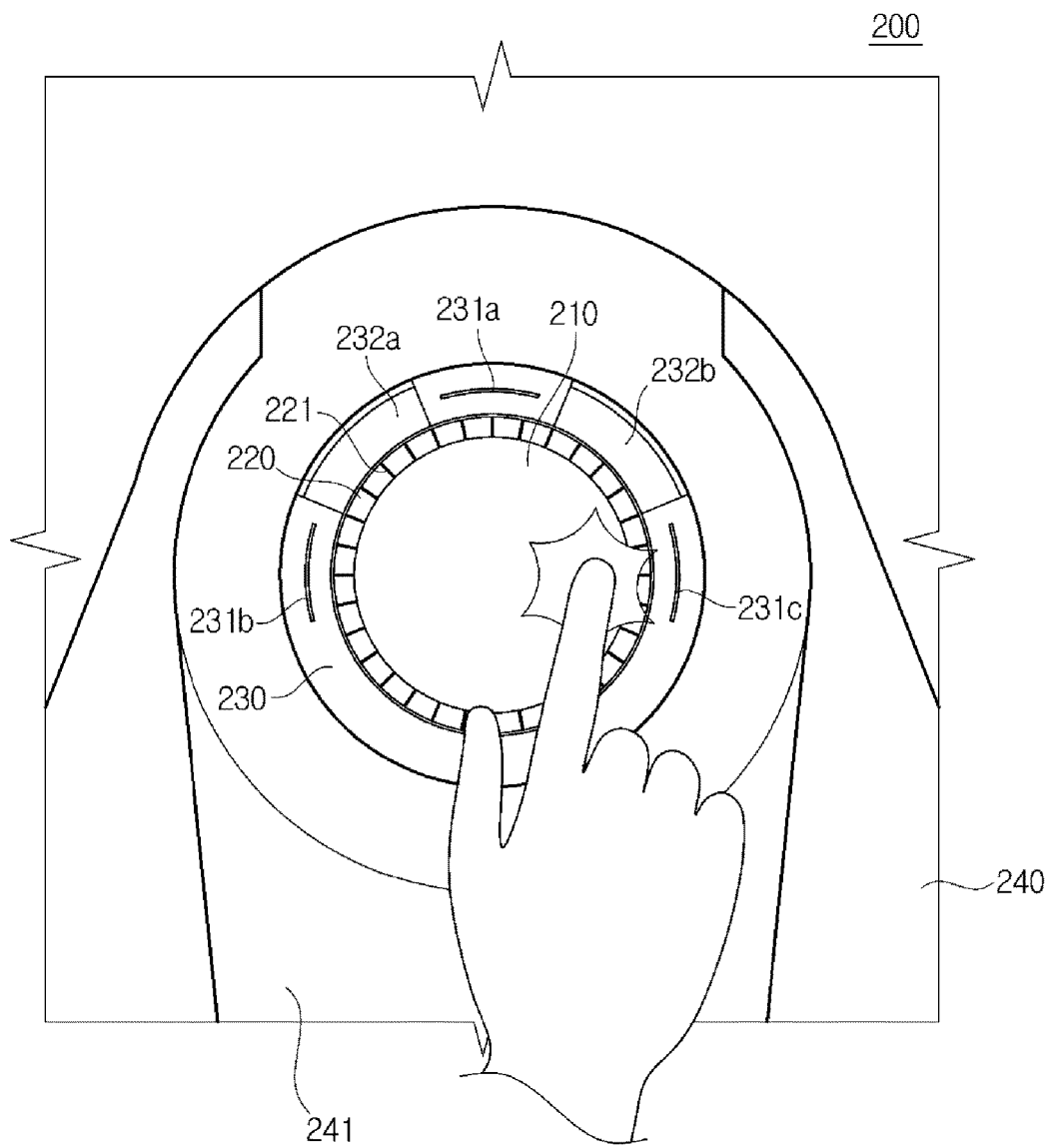

FIGS. 13, 14, and 15 are views for describing methods of manipulating the touch input device 200 according to the second embodiment of the present disclosure, wherein FIG. 13 is a plan view for describing a method of inputting a gesture, FIG. 14 is a plan view for describing a method of making a swiping input, and FIG. 15 is a plan view for describing a method of making a pressing input.

Referring to FIG. 13, a user may draw a gesture on the gesture input unit 210 to input an operation command. In FIG. 13, a flicking gesture of moving a pointer from left to right is shown. Also, referring to FIG. 14, the user may rub the swiping input unit 220 to input an operation command. In FIG. 14, a swiping gesture of moving the pointer from the left part of the swiping input unit 220 to the upper part of the swiping input unit 220 along the swiping input unit 220 is shown. Also, referring to FIG. 15, the user may press the gesture input unit 210 to input an operation command. In FIG. 15, operation of pressing the left part of the gesture input unit 210 is shown.

Figure 16:
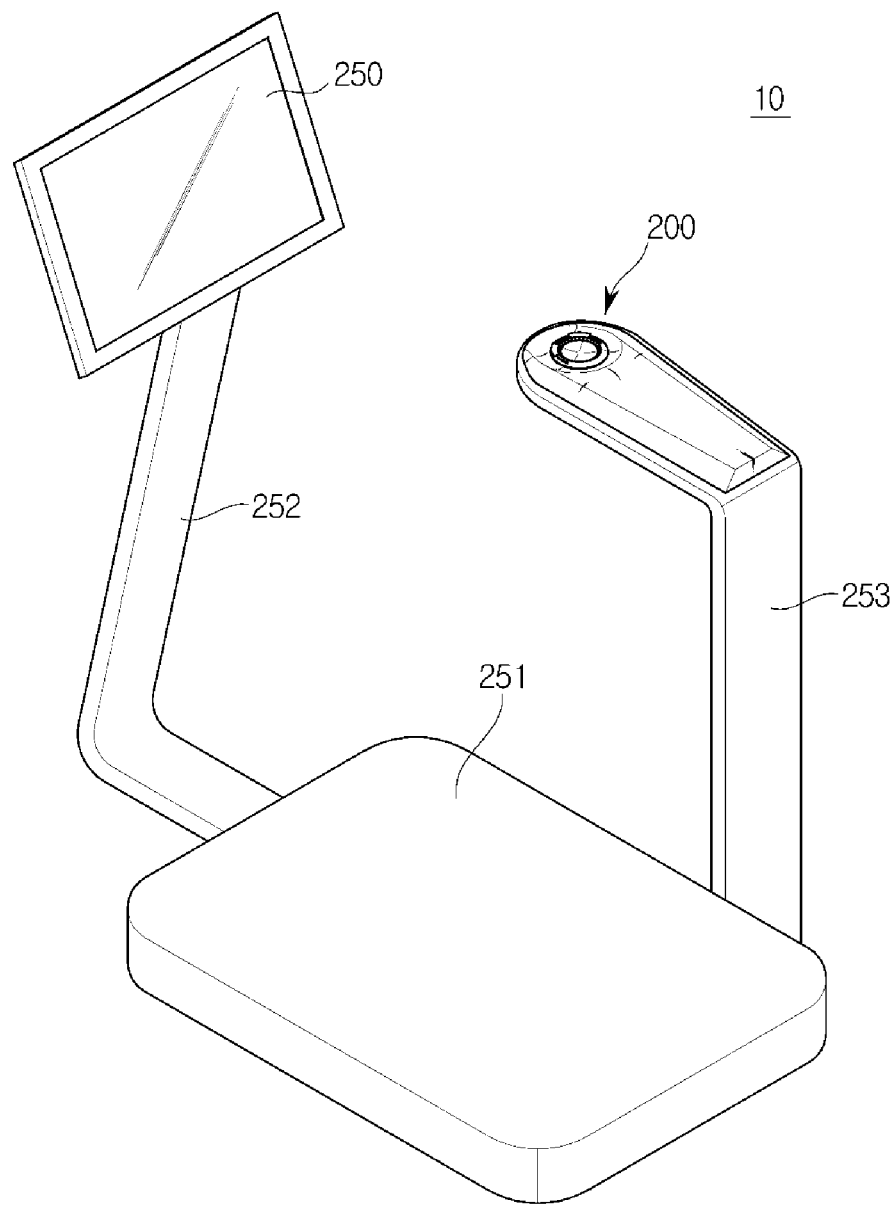
FIG. 16 is a perspective view illustrating a health device in which the touch input device in accordance with the second embodiment of the present invention is installed.

FIG. 16 is a perspective view of health-care equipment in which the touch input device 200 according to the second embodiment of the present disclosure is installed.

The touch input device 200 according to an embodiment of the present disclosure may be installed in health-care equipment 10. The health-care equipment 10 may be medical equipment. The health-care equipment 10 may include a main body 251 on which a user can stand, a display unit 250, a first connecting unit 252 to connect the display unit 250 to the main body 251, the touch input device 200, and a second connecting unit 253 to connect the touch input device 200 to the main body 251.

The main body 251 may measure a user's various physical information including the user's weight. Also, the display unit 250 may display various image information including the measured physical information. The user may manipulate the touch input device 200 while seeing the display unit 250.

Figure 17:
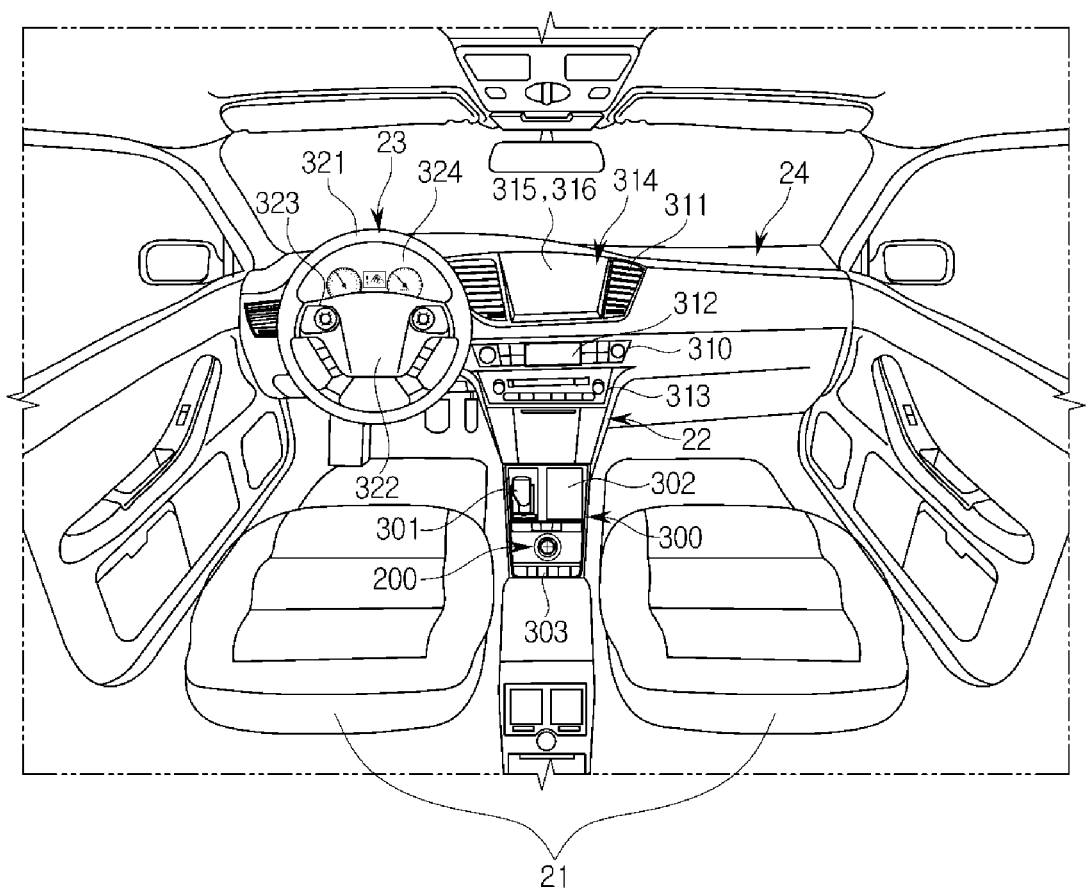
FIG. 17 is a view illustrating an interior of a vehicle in which the touch input device in accordance with the second embodiment of the present invention is installed.

The touch input device 200 according to an embodiment of the present disclosure may be installed in a vehicle 20 (see FIG. 17).

The vehicle 20 may be one of various kinds of machinery for transporting humans, things, animals, etc. from a departure point to a destination. The vehicle 20 may include a car that travels on roads or rails, a vessel that sails the sea or river, and an airplane that flies the sky using the effects of the air.

The car that travels on the roads or rails can move in a predetermined direction by rotation of at least one wheel. Examples of the car may include a three-wheeled vehicle, a four-wheeled vehicle, a two-wheeled vehicle, a motor bicycle, construction equipment, a bicycle, and a train running on a track.

Figure 18:
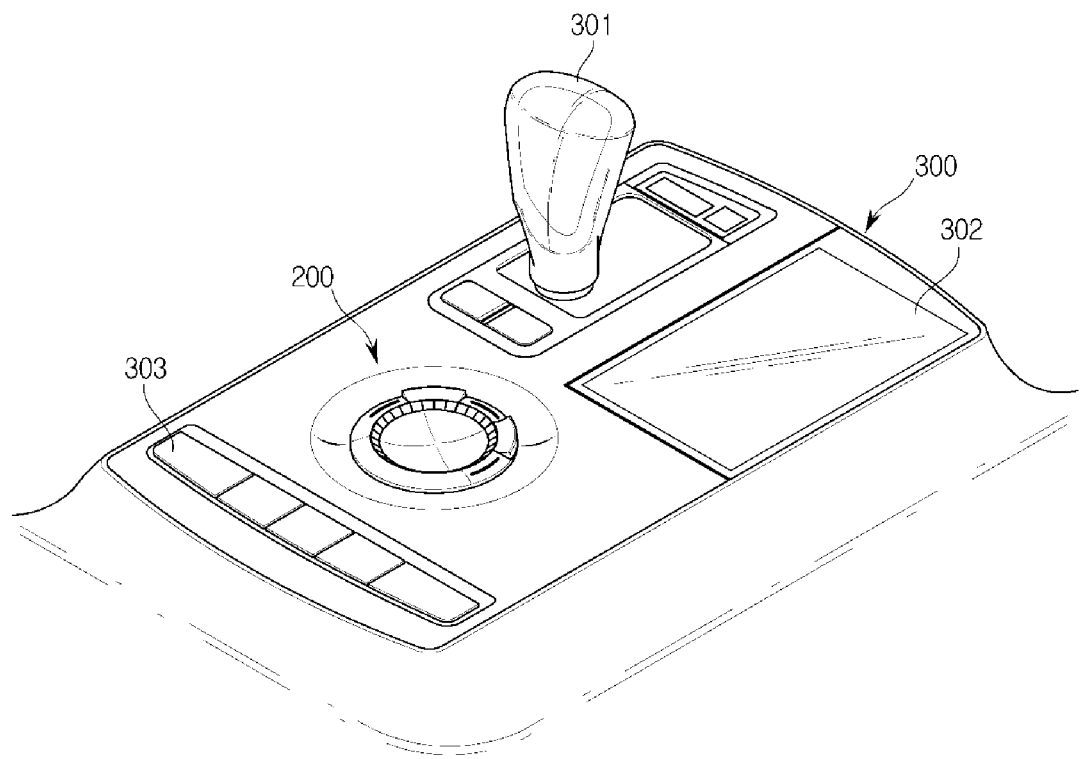
FIG. 18 is a perspective view illustrating a gearbox in which the touch input device in accordance with the second embodiment of the present invention is installed.

FIG. 17 shows the interior of the vehicle 20 in which the touch input device 200 according to the second embodiment of the present disclosure is installed, and FIG. 18 is a perspective view of a gear box 300 in which the touch input device 200 according to the second embodiment of the present disclosure is installed.

Referring to FIG. 17, the vehicle 20 may include seats 21 on which a driver and a passenger sit, and a dashboard 24 in which the gear box 300, a center fascia 22, a steering wheel 23, etc. are installed.

In the center fascia 22, an air conditioner 310, a clock 312, an audio system 313, an Audio Video Navigation (AVN) system 314, etc. may be installed.

The air conditioner 310 may adjust the temperature, humidity, air quality, and flow of air inside the vehicle 20 to maintain the inside of the vehicle 20 pleasant. The air conditioner 310 may be installed in the center fascia 22, and may include at least one vent 311 for discharging air. In the center fascia 22, at least one button or dial for controlling the air conditioner 310, etc. may be provided. A user such as a driver may use the button provided on the center fascia 310 to control the air conditioner 310.

The clock 312 may be positioned around the button or dial for controlling the air conditioner 310.

The audio system 313 may include an operation panel on which a plurality of buttons for performing the functions of the audio system 313 is arranged. The audio system 313 may provide a radio mode for providing a radio function, and a media mode for reproducing audio files stored in various storage media.

The AVN system 314 may be embedded in the center fascia 22 of the vehicle 20, or may protrude from the dashboard 24. The AVN system 314 can integratively perform an audio function, a video function, and a navigation function according to a user's manipulation. The AVN system 314 may include an input unit 315 to receive a user command related to the AVN system 314, and a display unit 316 to display a screen related to the audio function, a screen related to the video function, or a screen related to the navigation function. Meanwhile, the audio system 313 may be omitted as long as functions of the audio system 313 are the same as those of the AVN system 314.

The steering wheel 23, which is used to change the driving direction of the vehicle 20, may include a rim 321 that is gripped by a driver, and a spoke 322 connected to a steering apparatus of the vehicle 20 and connecting the rim 321 to a hub of a rotation axis for steering. According to an embodiment, a control unit 323 for controlling various systems (for example, the audio system 313) in the vehicle 20 may be mounted on the spoke 322.

Also, the dashboard 24 may further include an instrument panel 324 to inform a driver of driving speed, mileage, Revolutions Per Minute (RPM) of engine, an amount of oil, a temperature of cooling water, and various warnings, etc., during driving, and a globe box 325 to store various things.

The gear box 300 may be positioned between a driver seat and a passenger seat in the inside of the vehicle 20, and in the gear box 300, control units that the driver needs to manipulate during driving may be installed.

Referring to FIG. 18, in the gear box 300, a gearshift 301 to shift gears of the vehicle 20, a display unit 302 to control the execution of the functions of the vehicle 20, and a button 303 to execute various apparatuses installed in the vehicle 20 may be installed. Also, in the gear box 300, the touch input device 200 according to the second embodiment of the present disclosure may be installed.

The touch input device 200 according to an embodiment of the present disclosure may be installed in the gear box 300 so that a driver can manipulate the touch input device 200 while keeping eyes forward during driving. For example, the touch input device 200 may be positioned below the gearshift 301. Meanwhile, the touch input device 200 may be installed in the center fascia 22, in the passenger seat, or in the back seat.

The touch input device 200 may be electrically connected to display units installed in the vehicle 20 to allow a user to select or execute various icons displayed on the display units. The display units installed in the vehicle 20 may include the audio system 313, the AVN system 314, or the instrument panel 324. Also, the display unit 302 may be installed in the gear box 300, as necessary. Also, the display unit 302 may be electrically connected to a Head Up Display (HUD) or rearview mirrors.

For example, the touch input device 200 may move a cursor displayed on a display unit, or execute an icon displayed on the display unit. The icon may include a main menu, a selection menu, a setting menu, etc. Also, the touch input device 200 may be used to operate a navigation system, to set driving conditions of the vehicle 20, or to execute the peripherals of the vehicle 20.

Now, a structure of the touch input device 200 will be described with reference to FIGS. 19 and 20.

Figure 19:
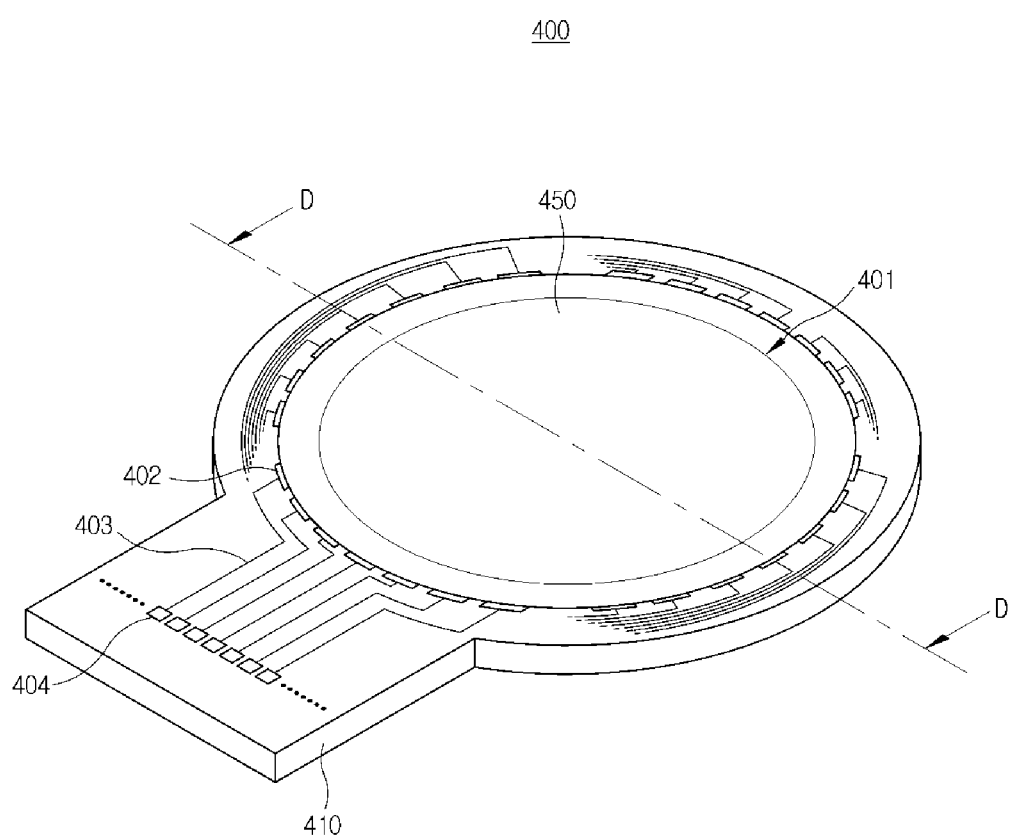
FIG. 19 is a perspective view showing an internal structure of the touch input device in accordance with the second embodiment of the present invention.

FIG. 19 is a perspective view showing an internal structure of the touch input device 200 according to the second embodiment of the present disclosure. Also, FIG. 20 is a structural view showing an electrode array of the touch input device 200 according to the second embodiment of the present disclosure.

Figure 20:
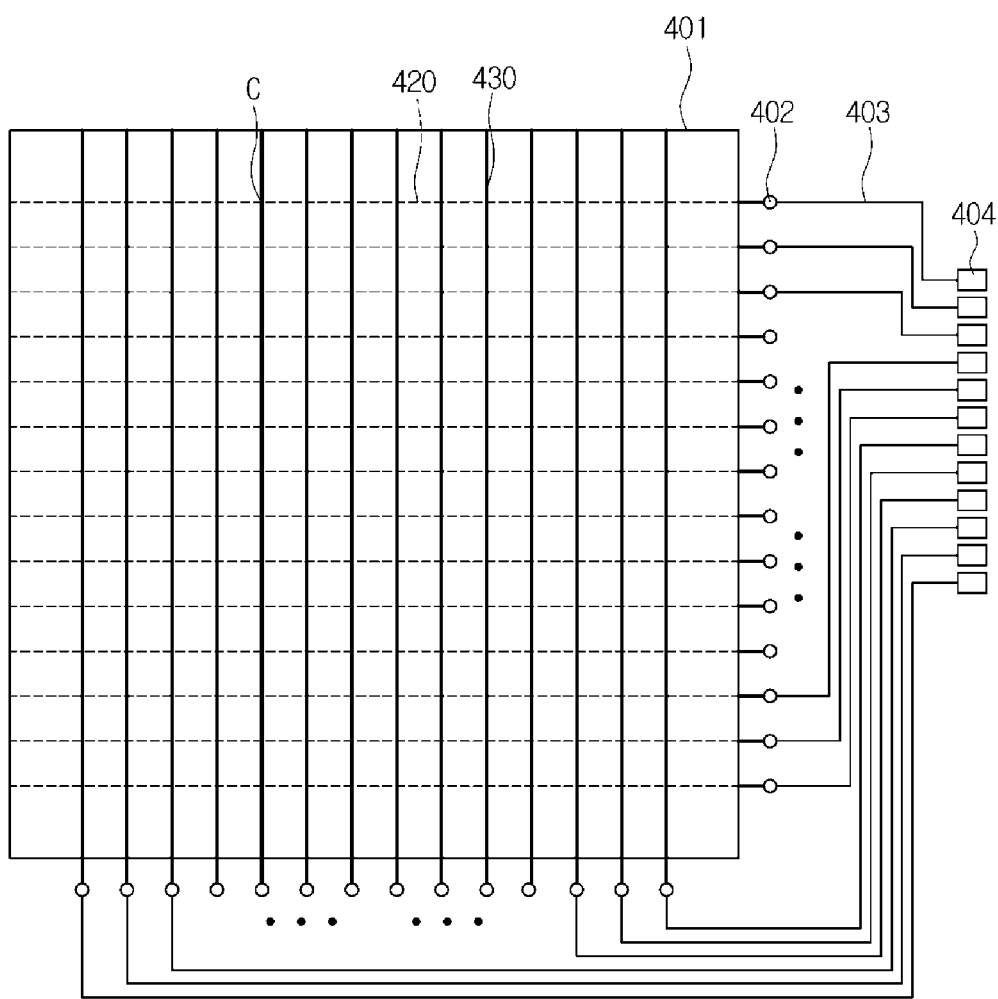
FIG. 20 is a view illustrating an arrangement of electrodes of the touch input device in accordance with the second embodiment of the present invention.

FIG. 20 is a plane view for easily describing an operation method of the touch input device 200, wherein the electrode array of the touch input device 200 shown in FIG. 20 is more or less different from a real electrode array of the touch input device 200.

The touch input device 200 may include a touch unit 401 that a user's input means (for example, a finger or a touch pen) contacts, a plurality of first and second sensing patterns 420 and 430 integrated into the touch unit 401 or disposed below the touch unit 401, and configured to receive touch signals, a plurality of wires 403 respectively connected to the first and second sensing patterns 420 and 430, a plurality of contact pads 404 connected to the wires 403, a base 410 on which the first and second sensing patterns 420 and 430 are formed, and a painted layer applied on the first sensing patterns 420. FIG. 19 shows a state in which the first and second sensing patterns 420 and 430 are covered by the painted layer 440 and not exposed to the outside.

The first sensing patterns 420 and the second sensing patterns 430 may be formed in a predetermined pattern in order to sense a change in capacitance when a user contacts the touch input device 200 with his/her finger, a touch pen, or the like to detect a position. Herein, "contact (touch)" may be defined as a meaning including both direct contact and indirect contact. That is, the direct contact may correspond to the case in which an object touches the touch input device 200, and the indirect contact correspond to the case in which an object approaches close to the touch input device 200 without touching the touch input device 200 to be within a range in which the first and second sensing patterns 420 and 430 can sense the object.

The first sensing patterns 420 may be arranged at regular intervals in a first direction (in FIG. 20, a horizontal direction), and the second sensing patterns 430 may be arranged at regular intervals in a direction (in FIG. 20, a vertical direction) that is different from the first direction. The first sensing patterns 420 and the second sensing patterns 430 may be respectively disposed on different layers, and form a plurality of intersections C. At the intersections C, the first sensing patterns 420 may overlap the second sensing patterns 430 with an insulating part in between, without directly contacting the second sensing patterns 430.

The intersections C may decide resolution of the touch unit 401, and may be recognized as coordinates. That is, the case in which input means contacts an intersection C may be distinguished from the case in which input means contacts another intersection adjacent to the intersection C, so that the location of an intersection C which input means contacts can be recognized. Accordingly, the more intersections C formed in the same area of the touch unit 401, the higher resolution of the touch unit 401.

The first sensing patterns 420 may be transmitter electrodes (TX electrodes). The first sensing patterns 420 may be arranged in parallel at regular intervals in the first direction (in FIG. 20, the horizontal direction), wherein the number of the rows of the first sensing patterns 420 arranged at regular intervals may correspond to horizontal resolution of the touch unit 401.

The second sensing patterns 430 may be receiver electrodes (RX electrodes). The second sensing patterns 430 may be arranged in parallel at regular intervals in the second direction (in FIG. 20, the vertical direction), wherein the number of the columns of the second sensing patterns 430 arranged at regular intervals may correspond to vertical resolution of the touch unit 401.

One ends of the first and second sensing patterns 420 and 430 may be connected to the wires 403 formed with metal or the like. Also, the contact pads 404 may be respectively connected to one ends of the wires 403, and the wires 403 may be connected to an integrated circuit (not shown) through the contact pads 404.

Also, at one ends of the first and second sensing patterns 420 and 430, a plurality of contacts 402 may be provided and connected to the wires 403. The contacts 402 may be electrically connected to the first and second sensing patterns 420 and 430, and have a width that is wider than that of the first and second sensing patterns 420 and 430. Accordingly, the contacts 402 may easily connect the first and second sensing patterns 420 and 430 to the wires 403. Also, the contacts 402 may be adhered to the wires 403 by a conductive adhesive (for example, solders).

Alternatively, the first and second sensing patterns 420 and 430 may be integrated into the wires 403. That is, the first and second sensing patterns 420 and 430 may extend to the outside of the touch unit 401 to be directly connected to the contact pads 404 connected to the integrated circuit.

The wires 403 may transfer sensing signals of the first and second sensing patterns 420 and 430 to the integrated circuit through the contact pads 404. The wires 403 and the contact pads 404 may be formed with a conductive material.

If input means contacts an area of the touch unit 401, the capacitance of the corresponding intersection C may be reduced, information about the capacitance may arrive at the integrated circuit operating as a controller through the wires 403 and the contact pads 404, and the controller may determine a location of the input means contacting the touch unit 401. Also, when input means approaches close to an area of the touch unit 401, the capacitance of the area may be reduced. In this case, the controller may determine a location of the input means approaching close to the touch unit 401.

Figure 21:
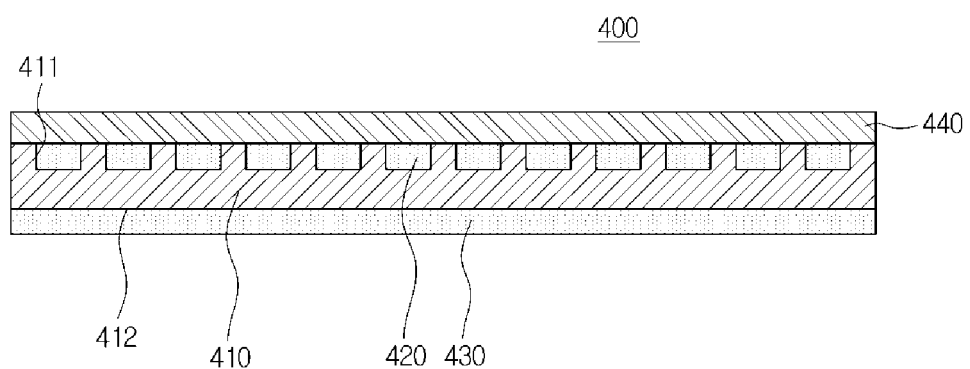
FIG. 21 is a cross-sectional view illustrating a touch input device in accordance with a third embodiment of the present invention.

FIG. 21 is a cross-sectional view of a touch input device 400 according to a third embodiment of the present disclosure.

Referring to FIG. 21, the touch input device 400 according to the third embodiment of the present disclosure may have a flat surface. However, the touch surface of the touch input device 400 may have one of various curved surfaces or a discontinuous surface. The discontinuous surface may include a combination of a flat surface and an inclined surface. The case in which the touch input device 400 has a curved surface will be described later.

The touch input device 400 may include a base 410 including a plurality of first pattern grooves 411 and a plurality of second pattern grooves 412, a plurality of first sensing patterns 420 plated in the first pattern grooves 411, a plurality of second sensing patterns 430 plated in the second pattern grooves 412, and a painted layer 440 to isolate the second sensing patterns 430.

The first sensing patterns 420 and the second sensing patterns 430 may be formed on one surface of the base 410 using a Laser Directing Structure (LDS) process. The LDS process is to form a support base with a material including a nonconductive and chemically stable metal composite, to expose a part of the support base to Ultra Violet (UV) laser or excimer laser to release the chemical bonding of the metal composite and expose metal seeds, and then to metalize the support base to form a conductive structure on the exposed part of the support base. The LDS process is disclosed in Korean Patent Registration No. 374667, Korean Laid-open Patent Application No. 4001-40872, and Korean Laid-open Patent Application No. 4004-21614, and this specification will refer to these disclosures.

Alternatively, the first sensing patterns 420 and the second sensing patterns 430 may be formed on one surface of the base 410 by injection, etching, or machining. An example of the machining may be 3Dimensional (3D) printing.

The first and second sensing patterns 420 and 430 may be formed with a conductive material, for example, metal. Also, the metal may be copper in consideration of conductivity and economic efficiency. However, the first and second sensing patterns 420 and 430 may be formed with another metal such as gold (Au).

The base 410 may include a metal composite. For example, the base 410 may be a composite including a resin and a metal oxide. Herein, the resin may include at least one of Polycabonate (PC), Polyamide (PA), and Acrylonitrile-Butadiene-Styrene copolymer (ABS), and the metal oxide may include at least one of Mg, Cr, Cu, Ba, Fe, Ti, and Al.

In one surface of the base 410, the first pattern grooves 411 may be formed to accommodate the first sensing patterns 420, and in the other surface of the base 410, the second pattern grooves 412 may be formed to accommodate the second sensing patterns 430. The first sensing patterns 420 may be disposed in the first pattern grooves 411, and the second sensing patterns 430 may be disposed in the second pattern grooves 412.

The base 410 may have the same thickness at the areas at which the first pattern grooves 411 and the second pattern grooves 412 are formed. That is, the lower surfaces of the first pattern grooves 411 and the lower surfaces of the second pattern grooves 412 may be maintained at a constant distance. Accordingly, the distance between the first sensing patterns 420 and the second sensing patterns 430 may be also constant. A change value of mutual capacitance may be constant throughout the entire touch area.

The first pattern grooves 411 may be formed by irradiating laser on one surface of the base 410, and the second pattern grooves 412 may be formed by irradiating laser on the other surface of the base 410. The first and second pattern grooves 411 and 412 may be reduced to metal by heat generated when the first and second pattern grooves 411 and 412 are formed, so that metal seeds may be formed in the first and second pattern grooves 411 and 412.

The first and second sensing patterns 420 and 430 may be respectively formed in the first and second pattern grooves 411 and 412 by plating the first and second pattern grooves 411 and 412. A process of performing plating on metal seeds is well known in the art, and accordingly, a detailed description thereof will be omitted.

Also, the first and second sensing patterns 420 and 430 may be formed by a deposition process. Also, the first and second sensing patterns 420 and 430 may be formed by a combination of the plating process and the deposition process. In the following description, it is assumed that the first and second sensing patterns 420 and 430 are formed by the plating process.

The first and second sensing patterns 420 and 430 may include a Cu plating layer, and nickel (Ni) may be plated on the Cu plating layer for antioxidant treatment. Also, if the first and second sensing patterns 420 and 430 include an Au plating layer, conductivity can be improved.

Hereinafter, a method of manufacturing the touch input device 400 according to the third embodiment of the present disclosure will be described with reference to FIGS. 22 to 27.

Figure 22:
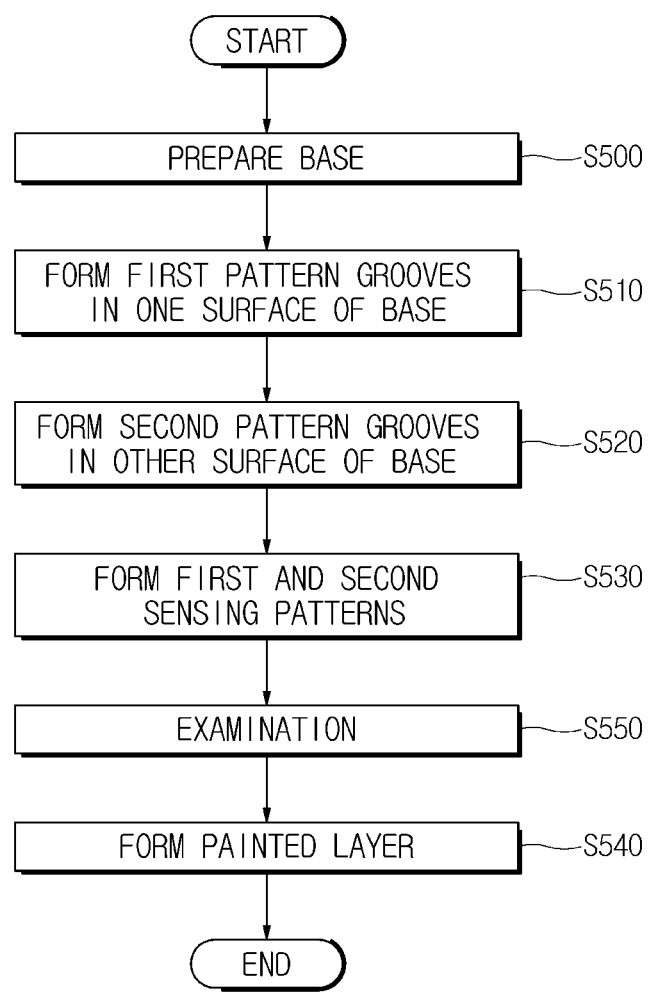
FIG. 22 is a flowchart illustrating a method of manufacturing the touch input device in accordance with the third embodiment of the present invention.

FIG. 22 is a flowchart illustrating a method of manufacturing the touch input device 400 according to the third embodiment of the present disclosure, and FIGS. 23 to 27 are cross-sectional views for describing the method of manufacturing the touch input device 400 according to the third embodiment of the present disclosure.

Figure 23:
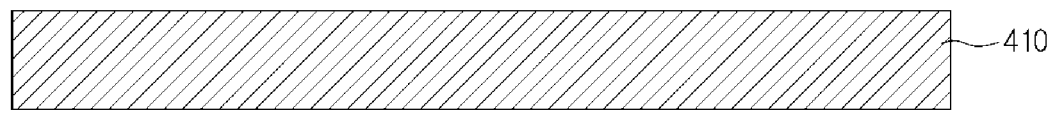
FIGS. 23-27 are cross-sectional views illustrating the method of manufacturing the touch input device in accordance with the second embodiment of the present invention, where

FIG. 23 is a view for describing operation S500 of preparing the base 410.

The base 410 may include a metal composite. Also, the base 410 may be formed using injection. Also, the base 410 may be formed by coating a metal composite on a base material, such as a resin, glass, leather, etc.

The base 410 may be formed with a predetermined thickness in correspondence to a touch area. The touch area may be an area in which the first and second sensing patterns 420 and 430 are formed.

However, unlike the shape of the base 410 shown in FIG. 23, the base 410 may have curved surfaces shaped to correspond to each other, at both opposite surfaces. For example, one surface of the base 410 may be formed as a concave curved surface corresponding to a part of the inner side surface of a sphere, and the other surface of the base 410 may be formed as a convex curved surface corresponding to a part of the outer side surface of the sphere. The curvature of the surface of the base 410 may be equal to the curvature of the other surface of the base 410.

Figure 24:
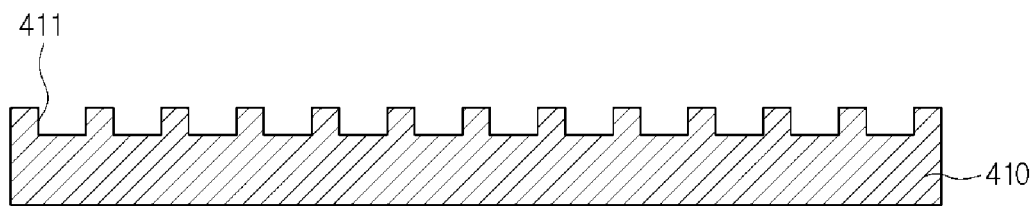

FIG. 24 is a view for describing operation S510 of forming the first pattern grooves 411.

The first pattern grooves 411 may be formed by irradiating laser, such as UV laser or excimer laser, on one surface of the base 410. Heat generated when the first pattern grooves 411 are formed may release the chemical bonding of the metal composite to reduce the metal composite to metal, thereby forming metal seeds in the first pattern grooves 411.

The first pattern grooves 411 may be formed in a curved surface of the base 410. Since the first pattern grooves 411 are formed by irradiating laser, the first pattern grooves 411 can be formed in various patterns regardless of the surface shape of the base 410.

Figure 25:
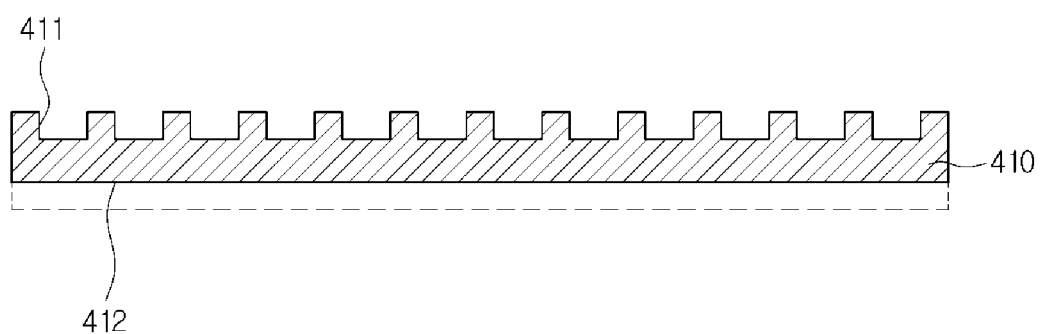

FIG. 25 is a view for describing operation S520 of forming the second pattern grooves 412.

The second pattern grooves 412 may be formed by irradiating UV laser or excimer laser on the other surface of the base 410, that is, the surface of the base 410 that is opposite to the surface of the base 410 in which the first pattern grooves 411 are formed. Heat generated when the second pattern grooves 412 are formed may release the chemical bonding of the metal composite to reduce the metal composite to metal, thereby forming metal seeds in the second pattern grooves 412.

The second pattern grooves 412 may be formed in a curved surface of the base 410. Since the second pattern grooves 412 are formed by irradiating laser, the second pattern grooves 412 can also be formed in various patterns regardless of the surface shape of the base 410.

Also, the distance between the first pattern grooves 411 and the second pattern grooves 412 may be constant throughout the touch area. That is, the first pattern grooves 411 and the second pattern grooves 412 may be formed with the same depth in both surfaces of the base 410 having a constant thickness in the touch area.

Meanwhile, the first pattern grooves 411 and the second pattern grooves 412 may be formed by a single process. For example, laser may move on one surface of the base 410 to form the first pattern grooves 411, and may move on the other surface of the base 410 to form the second pattern grooves 412. Also, laser may move on both surfaces of the base 410 to form the first pattern grooves 411 and the second pattern grooves 412 simultaneously.

Figure 26:
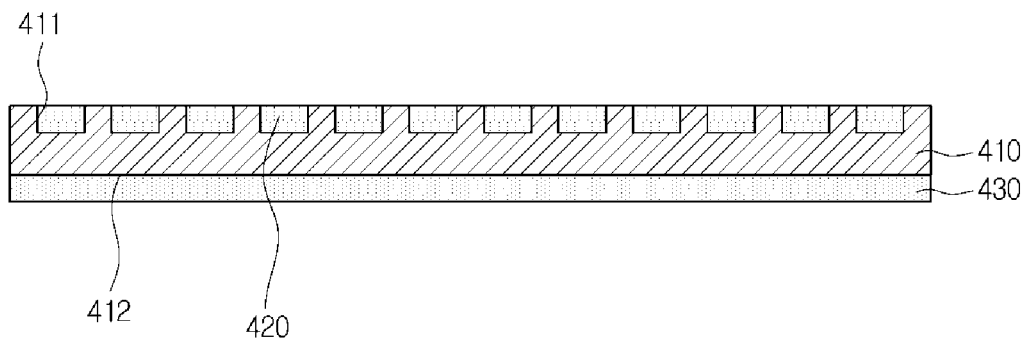

FIG. 26 is a view for describing operation S530 of forming the first and second sensing patterns 420 and 430.

The first and second sensing patterns 420 and 430 may be formed by metalizing the exposed metal seeds of the first and second pattern grooves 411 and 412. For example, the first and second sensing patterns 420 and 430 may include copper plating layers plated on the first and second pattern grooves 411 and 412. Also, for antioxidant treatment, nickel may be plated on the copper plating layers.

Meanwhile, the first sensing patterns 420 and the second sensing patterns 430 may be formed by a single process. For example, the first sensing patterns 420 and the second sensing patterns 430 may be simultaneously formed by performing plating one time.

Figure 27:
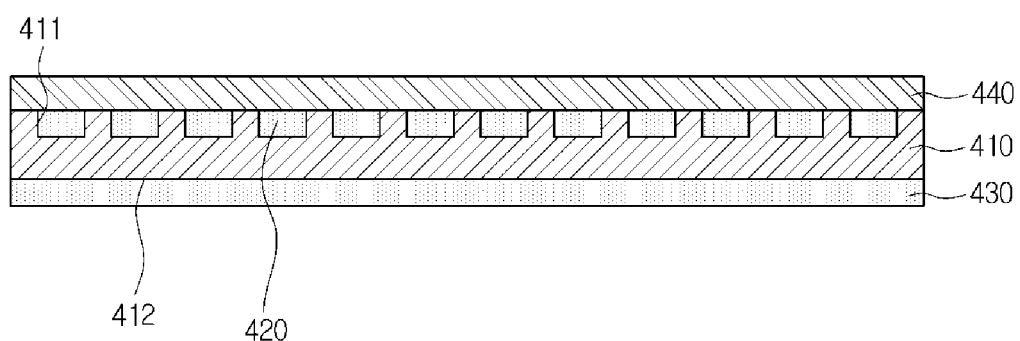

FIG. 27 is a view for describing operation S540 of forming the painted layer 440.

The painted layer 440 may be coated on one surface of the base 410 in order to protect the first and second sensing patterns 420 and 430 from an external impact or dust. Also, the painted layer 440 may form the touch surface of the touch unit 401 which a user contacts.

The painted layer 440 may be formed by UV painting or UV coating using sunscreen agents.

Also, although not shown in the drawings, examination operation S550 of examining whether the touch input device 400 manufactured by operations shown in FIGS. 23 to 27 operates properly may be further performed.

The examination operation S550 may be performed by supplying current to the first and second sensing patterns 420 and 430, and measuring a change in mutual capacitance between the first and second sensing patterns 420 and 430 to determine whether the first and second sensing patterns 420 and 430 can be used as sensors. In order for the touch input device 400 to function as a product, when input means contacts the touch unit 401, mutual capacitance between the first and second sensing patterns 420 and 430 should change so that a location of the touch unit 401 which the input means contacts can be detected based on the changed mutual capacitance.

Meanwhile, the examination operation S550 may be performed before operation S540 of forming the painted layer 440. The reason is because the first or second sensing patterns 420 and 430 need to be repaired if the first or second sensing patterns 420 and 430 are determined to be unsuitable in the examination operation S550.

Figure 28:
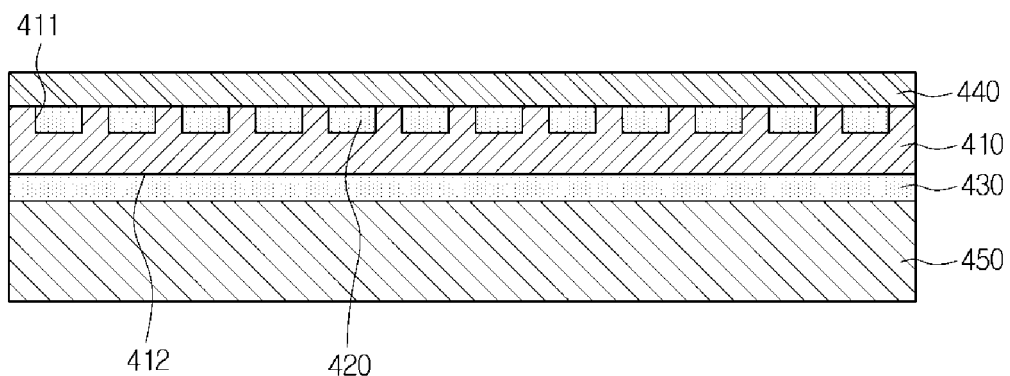
FIG. 28 is a cross-sectional view illustrating a touch input device in accordance with a fourth embodiment of the present invention.

FIG. 28 is a cross-sectional view of a touch input device 400-1 according to a fourth embodiment of the present disclosure.

Referring to FIG. 28, the touch input device 400-1 according to the fourth embodiment of the present disclosure may be formed by coating the base 410 on a base material 450 formed with one of various materials. The base material 450 may include a resin, glass, or leather. The base material 450 may be stiff or elastic. Also, the base material 450 may be rigid after being hardened or flexible.

Meanwhile, the touch input device 400 according to the third embodiment of the present disclosure may include the touch unit 401 formed in a curved shape. Accordingly, the first and second sensing patterns 420 and 430 may be bent along the curvature of the touch surface. For example, the first and second sensing patterns 420 and 430 may be formed to correspond to the touch units 210 and 220 of the touch input device 200 according to the second embodiment of the present disclosure as shown in FIGS. 10 to 12.

The curved surface of the touch unit 401 may include a curved surface having a constant curvature, and a curved surface having different curvatures. Also, the curved surface of the touch unit 401 may include a curved surface having two or more curvatures, and a curved surface bent in different directions according to coordinates. Also, the touch unit 401 may be provided as a bent surface. For example, a touch signal may be input along a edge at which two surfaces extending in different directions meet.

The base 410 may include curved surfaces in its both surfaces. For example, one surface of the base 410 may be formed in the shape of a part of a concave spherical surface, and the other surface of the base 410 may be formed in the shape of a part of a convex spherical surface. Also, the first and second pattern grooves 411 and 412 may be formed in the curved surface of the base 410. Since the first and second pattern grooves 411 and 412 are formed using laser, the first pattern grooves 411 may be formed in a complicated shape regardless of the shape of the base 410.

Then, the first and second sensing patterns 420 and 430 may be plated on the first and second pattern grooves 411 and 412. Due to the properties of plating, the first and second sensing patterns 420 and 430 can be plated regardless of the shapes of the first and second pattern grooves 411 and 412, and even when the first and second pattern grooves 411 and 412 are neither linear nor flat, the first and second sensing patterns 420 and 430 can be easily plated on the first and second pattern grooves 411 and 412.

Hereinafter, a method in which a touch signal is input to the gesture input unit 210 and the swiping input unit 220 will be described with reference to FIG. 12.

The first and second sensing patterns 420 and 430 may be configured to cover both the gesture input unit 210 disposed in the center area of the touch unit 401, and the swiping input unit 220 disposed in the edge area of the touch unit 401. That is, the first and second sensing patterns 420 and 430 may extend from the gesture input unit 210 to the swiping input unit 220.

For example, the outermost patterns of the first and second sensing patterns 420 and 430 may be arranged to correspond to the swiping input unit 220. Accordingly, if mutual capacitance of the outermost patterns of the first and second sensing patterns 420 and 430 changes, the controller may determine that a user touches the swiping input unit 220, and if mutual capacitance of the other patterns of the first and second sensing patterns 420 and 430 changes, the controller may determine that the user touches the gesture input unit 210.

As such, since the first and second sensing patterns 420 and 430 can separate a touch signal acquired from the gesture input unit 210 from a touch signal acquired from the swiping input unit 220, a manufacturing process can be simplified.

Figure 29:
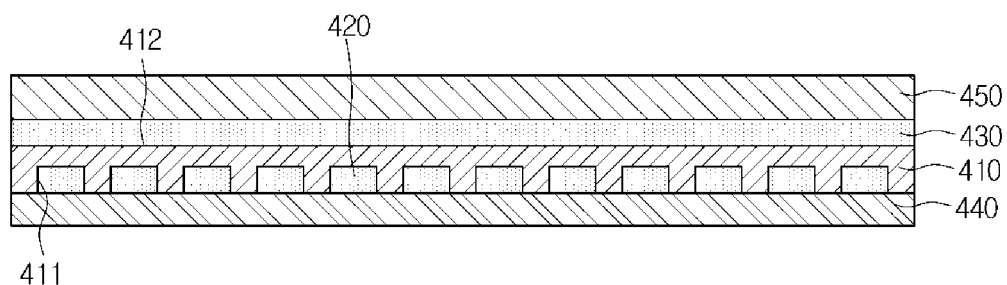
FIG. 29 is a cross-sectional view illustrating a touch input device in accordance with a fifth embodiment of the present invention.

FIG. 29 is a cross-sectional view of a touch input device 400-2 according to a fifth embodiment of the present disclosure.

Referring to FIG. 29, the touch input device 400-2 according to the fifth embodiment of the present disclosure may be formed by coating the base 410 on the base material 450 formed with one of various materials. The base material 450 may be stiff or elastic. Also, the base material 450 may be rigid after being hardened, or flexible. Also, the base material 450 may be formed by injection-molding.

The first sensing patterns 420 may be formed on one surface of the base 410, and the second sensing patterns 430 may be formed on the other surface of the base 410. The first and second sensing patterns 420 and 430 may be formed on both surfaces of the base 410, and then, the base 410 may be disposed on the base material 450.

The base material 450 may be formed with a nonconductive material. For example, the base material 450 may include a resin, glass, or leather. Also, the base material 450 may have a thin thickness. The thickness of the base material 450 can be decided within a range in which mutual capacitance of the first and second sensing patterns 420 and 430 disposed in the rear surface of the base material 450 can change when a user touches the base material 450 with his/her hand.

By combining the base 410 in which the first and second sensing patterns 420 and 430 are formed with the base material 450, the utilization of the touch input device can be enhanced.

Most of all, the base 410 may be coated on the base material 450 formed with any one of various materials. That is, the base material 450 can be selected from various kinds of materials. Also, since the base 410 is coated and then disposed on the base material 450, durability against heat or vibration can be improved.

For example, when the touch input device according to an embodiment of the present disclosure is used in a vehicle, the touch input device can be used in various ways. As shown in FIG. 18, the touch input device may be installed in the gear box 300 to be used as a central control system, and also the touch input device may be installed in a handle, a door trim, a ceiling, glass, a pillar, or the like.

Figure 30:
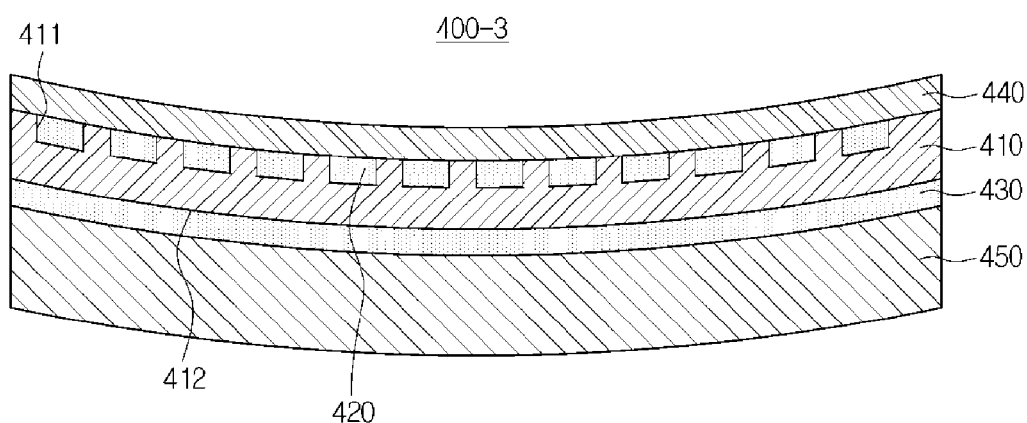
FIG. 30 is a cross-sectional view illustrating a touch input device in accordance with a sixth embodiment of the present invention.
Figure 31:
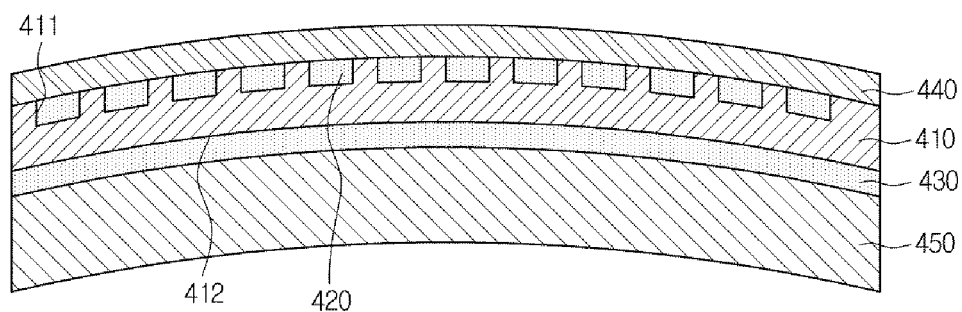
FIG. 31 is a cross-sectional view illustrating a touch input device in accordance with a seventh embodiment of the present invention.

FIGS. 30 and 31 show cases in which the touch input device according to an embodiment of the present disclosure have various curved surfaces.

FIG. 30 shows a touch input device 400-3 according to a sixth embodiment of the present disclosure, and FIG. 31 shows a touch input device 400-4 according to a seventh embodiment of the present disclosure.

Referring to FIG. 30, the touch input device 400-3 according to the sixth embodiment of the present disclosure may have a concave curved surface. FIG. 30 shows a cross-section of the touch input device 400-3. When the touch input device 400-3 is shown in a front direction, the touch input device 400-3 may appear in the shape of a concave bowl.

Referring to FIG. 31, the touch input device 400-4 according to the seventh embodiment of the present disclosure may have a convex curved surface. FIG. 31 shows a cross-section of the touch input device 400-4. When the touch input device 400-4 is shown in a front direction, the touch input device 400-4 may appear in the shape of a part of the outer side surface of a sphere.

According to an aspect, since the touch input device according to an embodiment of the present disclosure is manufactured using a LDS method, a manufacturing process can be simplified, and process costs can be reduced.

Even when the touch unit has a curved surface, the sensing patterns can be easily formed. Particularly, even when the touch unit has curved surfaces of different curvatures, the sensing patterns can be formed.

Since no adhesion process is used when the sensing patterns are formed on the base, the touch input device can be protected from vibrations and impacts and has high durability.

Since the touch input device is manufactured in a high-temperature environment using laser, the reliability of the touch input device in a high-temperature environment can be ensured.

Since two kinds of electrode patterns are respectively formed on both surfaces of the base, the touch input device can be more slimmed.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A touch input device comprising:
 a base including a metal composite;
 a first pattern groove formed concavely in a first surface of the base;
 a second pattern groove formed concavely in a second surface of the base;
 a first sensing pattern disposed in the first pattern groove and including a conductive material;
 a second sensing pattern disposed in the second pattern groove and including a conductive material; and
 a wire connecting the first sensing pattern and the second sensing pattern to an integrated circuit.

2. The touch input device according to claim 1, wherein the first pattern groove intersects with the second pattern groove with the base placed in between.

3. The touch input device according to claim 1, wherein the base includes a resin containing at least one of Polycarbonate (PC), Polyamide (PA), and Acrylonitrile-Butadiene-Styrene copolymer (ABS), and a metal oxide containing at least one of Mg, Cr, Cu, Ba, Fe, Ti, and Al.

4. The touch input device according to claim 1, wherein the base is coated on a resin, glass, or leather.

5. The touch input device according to claim 1, wherein the base has the same thickness at areas in which the first pattern groove and the second pattern groove are disposed.

6. The touch input device according to claim 5, wherein the first pattern groove and the second pattern groove have the same depth.

7. The touch input device according to claim 1, wherein the first surface of the base is a curved surface or a discontinuous surface, and the second surface of the base corresponds to a shape of an opposite surface of the base.

8. A method of manufacturing a touch input device, comprising:
 preparing a base including a metal composite;
 forming a first pattern groove by irradiating laser on a first surface of the base;
 forming a second pattern groove by irradiating laser on a second surface of the base;
 forming a first sensing pattern and a second sensing pattern by performing plating or deposition on the first pattern groove and the second pattern groove; and
 determining whether the first sensing pattern and the second sensing pattern are able to operate as sensors by supplying current to the first sensing pattern and the second sensing pattern, and detecting a change in mutual capacitance between the first sensing pattern and the second sensing pattern.

9. The method according to claim 8, further comprising coating the base on one of a resin, glass, or leather.

10. The method according to claim 8, wherein if laser is irradiated to both of the first and second surfaces of the base, metal seeds are exposed from inner side surfaces of the first pattern groove and the second pattern groove, and if the first sensing pattern and the second sensing pattern are plated or deposited, a conductive material is attached on the metal seeds.

11. A vehicle comprising the touch input device according to claim 1.

12. The vehicle according to claim 11, wherein the touch input device is installed at a centralized control system in a gear box.

13. A vehicle comprising:
- a base including a metal composite coated on a rear surface of a resin, glass, or leather;
- a first pattern groove formed concavely in a first surface of the base;
- a second pattern groove formed concavely in a second surface of the base;
- a first sensing pattern disposed in the first pattern groove, and including a conductive material;
- a second sensing pattern disposed in the second pattern groove, and including a conductive material; and
- a wire connecting the first sensing pattern and the second sensing pattern to an integrated circuit.

* * * * *